United States Patent
Pavek et al.

(10) Patent No.: US 9,870,620 B2
(45) Date of Patent: Jan. 16, 2018

(54) NON-LINEAR ASSOCIATOR AND MOTION DISCRIMINATOR

(71) Applicant: The Johns Hopkins University, Baltimore, MD (US)

(72) Inventors: Richard E. Pavek, Silver Spring, MD (US); Alexander S. Hughes, Cooksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 129 days.

(21) Appl. No.: 15/096,311

(22) Filed: Apr. 12, 2016

(65) Prior Publication Data

US 2016/0371849 A1 Dec. 22, 2016

Related U.S. Application Data

(60) Provisional application No. 62/181,387, filed on Jun. 18, 2015.

(51) Int. Cl.
| | |
|---|---|
| G06T 7/20 | (2017.01) |
| G06K 9/62 | (2006.01) |
| G06T 7/00 | (2017.01) |
| G01S 13/52 | (2006.01) |
| G06T 7/277 | (2017.01) |
| G06K 9/32 | (2006.01) |
| G01S 7/41 | (2006.01) |

(52) U.S. Cl.
CPC ............... *G06T 7/20* (2013.01); *G01S 7/414* (2013.01); *G06K 9/3233* (2013.01); *G06T 7/277* (2017.01); *G01S 13/52* (2013.01); *G06T 2207/10044* (2013.01)

(58) Field of Classification Search
CPC . G06T 7/20; G06T 7/277; G06T 2207/10044; G06K 9/3233; G01S 7/414; G01S 13/52
See application file for complete search history.

(56) References Cited

U.S. PATENT DOCUMENTS

| | | |
|---|---|---|
| 4,005,415 A | 1/1977 | Kossiakoff et al. |
| 5,070,335 A | 12/1991 | Lewis et al. |
| 5,235,339 A | 8/1993 | Morrison et al. |
| 5,947,900 A | 9/1999 | Derbyshire et al. |
| 6,031,568 A | 2/2000 | Wakitani |
| 6,292,683 B1 | 9/2001 | Gupta et al. |
| 6,516,213 B1 | 2/2003 | Nevo |
| 6,559,641 B2 | 5/2003 | Thesen |
| 6,687,405 B1 | 2/2004 | Trew et al. |
| 6,879,160 B2 | 4/2005 | Jakab |

(Continued)

OTHER PUBLICATIONS

Wu et al. "Translational Motion Compensation in ISAR Image Processing." IEEE Transactions on Image Processing, vol. 4, No. 11, Nov. 1995, pp. 1561-1571.*

*Primary Examiner* — Jon Chang
(74) *Attorney, Agent, or Firm* — Noah J. Hayward

(57) ABSTRACT

An image analyzer includes processing circuitry that receives at least one image having a first set of bins and a second set of bins, shifts the first or second set of bins by a number of bins associated with a motion hypothesis to achieve sets of aligned bins, determines a product for each set of aligned bins, compares the products to a product threshold, and identifies an object based on the products that exceed the product threshold.

20 Claims, 13 Drawing Sheets

(56) References Cited

U.S. PATENT DOCUMENTS

| | | |
|---|---|---|
| 7,298,867 B2 | 11/2007 | Slaski |
| 7,457,472 B2 | 11/2008 | Pace et al. |
| 7,620,204 B2 | 11/2009 | Porikli et al. |
| 7,710,498 B2 | 5/2010 | Kondo et al. |
| 7,741,992 B2 | 6/2010 | Wang et al. |
| 7,860,344 B1 | 12/2010 | Fitzpatrick et al. |
| 7,885,329 B2 | 2/2011 | Nakamura et al. |
| 7,916,068 B2 | 3/2011 | Wicks et al. |
| 7,977,942 B2 | 7/2011 | White |
| 8,102,310 B2 | 1/2012 | Krikorian et al. |
| 8,224,029 B2 | 7/2012 | Saptharishi et al. |
| 8,229,163 B2 | 7/2012 | Coleman et al. |
| 8,305,261 B2 | 11/2012 | Hunter |
| 8,314,732 B2 | 11/2012 | Oswald et al. |
| 8,320,618 B2 | 11/2012 | Ikenoue |
| 8,390,291 B2 | 3/2013 | MacFarlane et al. |
| 8,405,540 B2 | 3/2013 | Porikli |
| 8,407,625 B2 | 3/2013 | Cohen et al. |
| 8,411,947 B2 | 4/2013 | Attwood |
| 8,588,517 B2 | 11/2013 | Lee et al. |
| 8,681,100 B2 | 3/2014 | Givon |
| 8,812,226 B2 | 8/2014 | Zeng |
| 8,848,979 B2 | 9/2014 | Ishikawa |
| 9,268,008 B1 * | 2/2016 | Abileah ................ G01S 13/534 |
| 2005/0054910 A1 | 3/2005 | Tremblay et al. |
| 2010/0207806 A1 * | 8/2010 | Takahashi ............. G01S 13/106 |
| | | 342/109 |
| 2011/0241928 A1 | 10/2011 | Oswald et al. |

\* cited by examiner

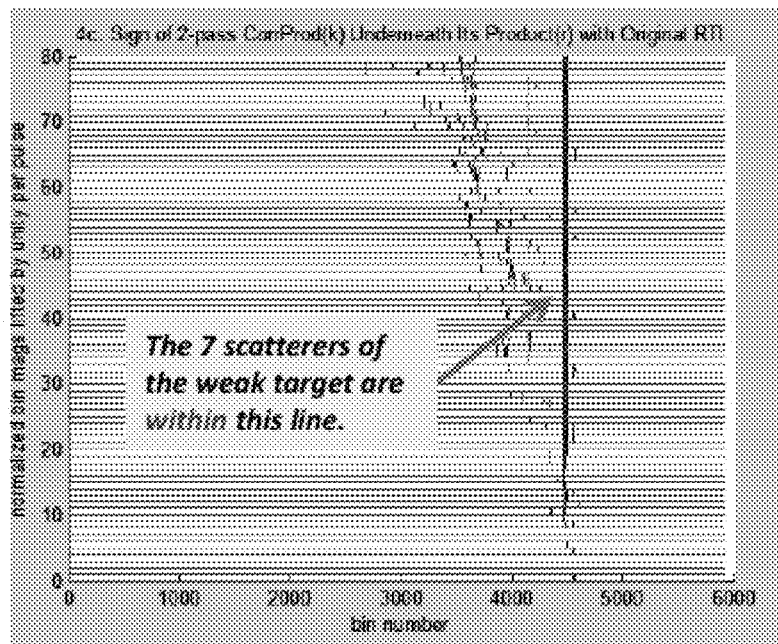
FIG. 9B
FIG. 9C
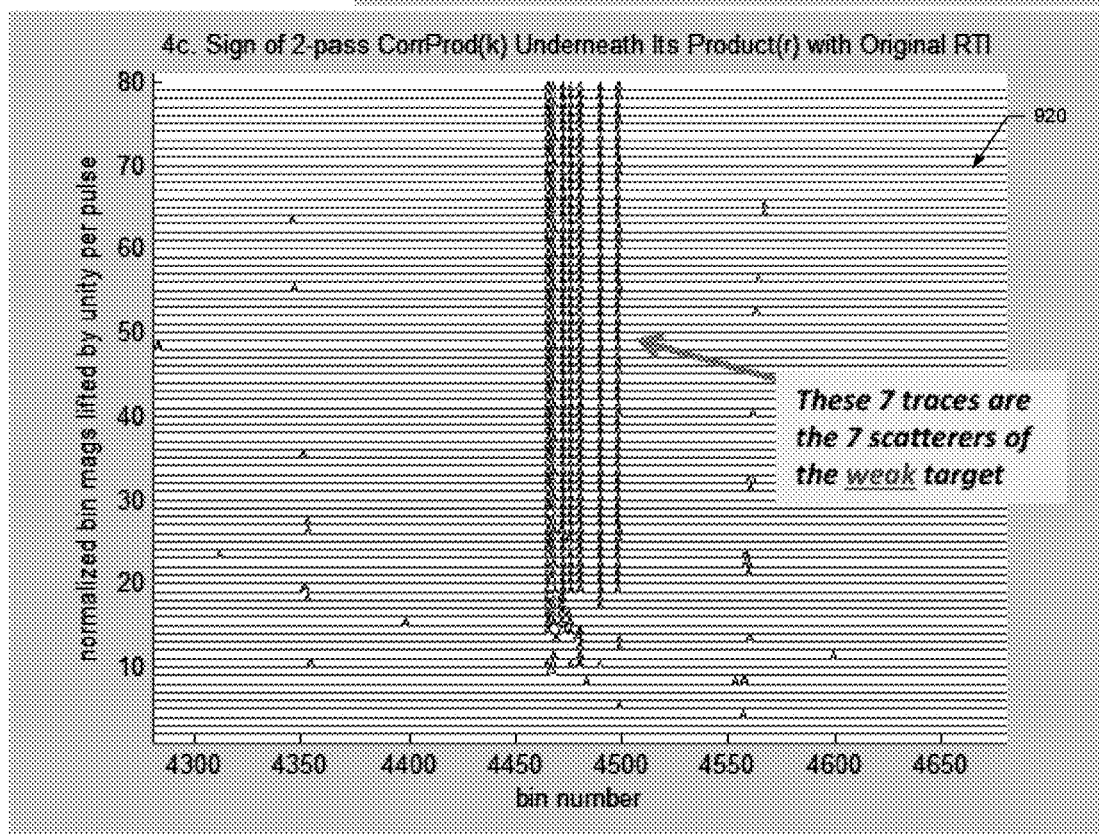

NON-LINEAR ASSOCIATOR AND MOTION DISCRIMINATOR

CROSS REFERENCE TO RELATED APPLICATIONS

This application claims priority to and the benefit of U.S. Provisional Application Ser. No. 62/181,387 filed on Jun. 18, 2015, the entire contents of which are hereby incorporated herein by reference.

STATEMENT OF GOVERNMENTAL INTEREST

This invention was made with Government support under contract number HQ0006-07-D-0001 awarded by the Missile Defense Agency (MDA). The Government has certain rights in the invention.

TECHNICAL FIELD

Example embodiments generally relate to image analysis and, in particular, relate to non-linear association and motion discrimination (NAMD) of images.

BACKGROUND

Current methods for target detection and tracking in images (e.g. radar or light images), such as constant false alarm rate (CFAR), may be ineffective in an instance in which the target has an amplitude near clutter levels or where there is a high clutter density. Even without clutter, a single target crossing a second target with a slow crossing-rate may cause challenges in tracking. The failure to associate a target in dense scenes, such as scenes with multiple targets, or scenes with targets in clutter, may prevent tracking or isolation of target detections in densely arranged targets and/or clutter.

Kalman and other conventional tracker/filters, may require well established associated measurements, which may not be possible in dense clutter or with targets with unremarkable amplitude. Euclidian distance is used by conventional tracker/filters, including Kalman, as a metric of association. However these distances go to zero at each crossing, making the Euclidian distance nearly useless in dense scenes. Feature based associations may be used as an alternative to Euclidean distance. However, feature associations have limited capability in a dense scene, where targets are not isolated from the dense clutter. Radar polarization may provide some relief, in an instance in which a co-cell does not falsify the association. Lacking association, target extent and motion may not be observable in dense scenes.

Coherent integration may be utilized to suppress clutter, but may require long interrogation time before adequate suppression allows for association and tracking by conventional tracker/filters.

BRIEF SUMMARY OF SOME EXAMPLES

Accordingly, in some example embodiments, an image analyzer is provided including processing circuitry configured to receive at least one image comprising a first set of bins and a second set of bins, shift the first or second set of bins by a number of bins associated with a motion hypothesis to achieve set of aligned bins, determine a product for each set of aligned bins, compare the products to a product threshold, and identify an object based on products that exceed the product threshold.

In another example embodiment, an image analyzer system is provided including a sensor configured to capture images and an image analyzer including processing circuitry. The processing circuitry is configured to receive at least one image comprising a first set of bins and a second set of bins, shift the first or second set of bins by a number of bins associated with a motion hypothesis to achieve sets of aligned bins, determine a product for each set of aligned bins, compare the products to product threshold, and identify an object based on products that exceed the product threshold.

BRIEF DESCRIPTION OF THE SEVERAL VIEWS OF THE DRAWINGS

Figure 1:
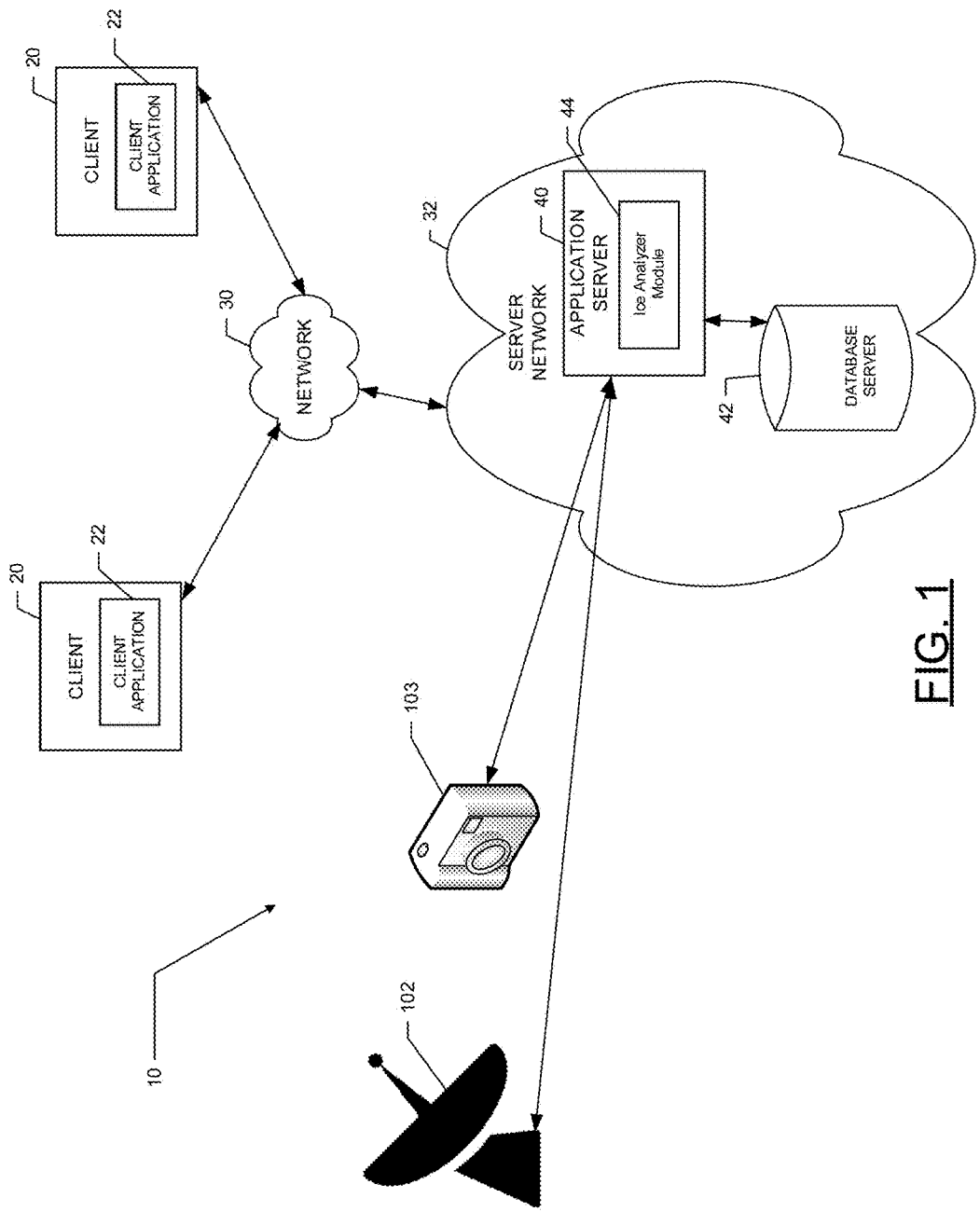

Having thus described the image analyzer in general terms, reference will now be made to the accompanying drawings, which are not necessarily drawn to scale, and wherein:

FIG. 1 illustrates a system for image analysis according to an example embodiment.

Figure 2:
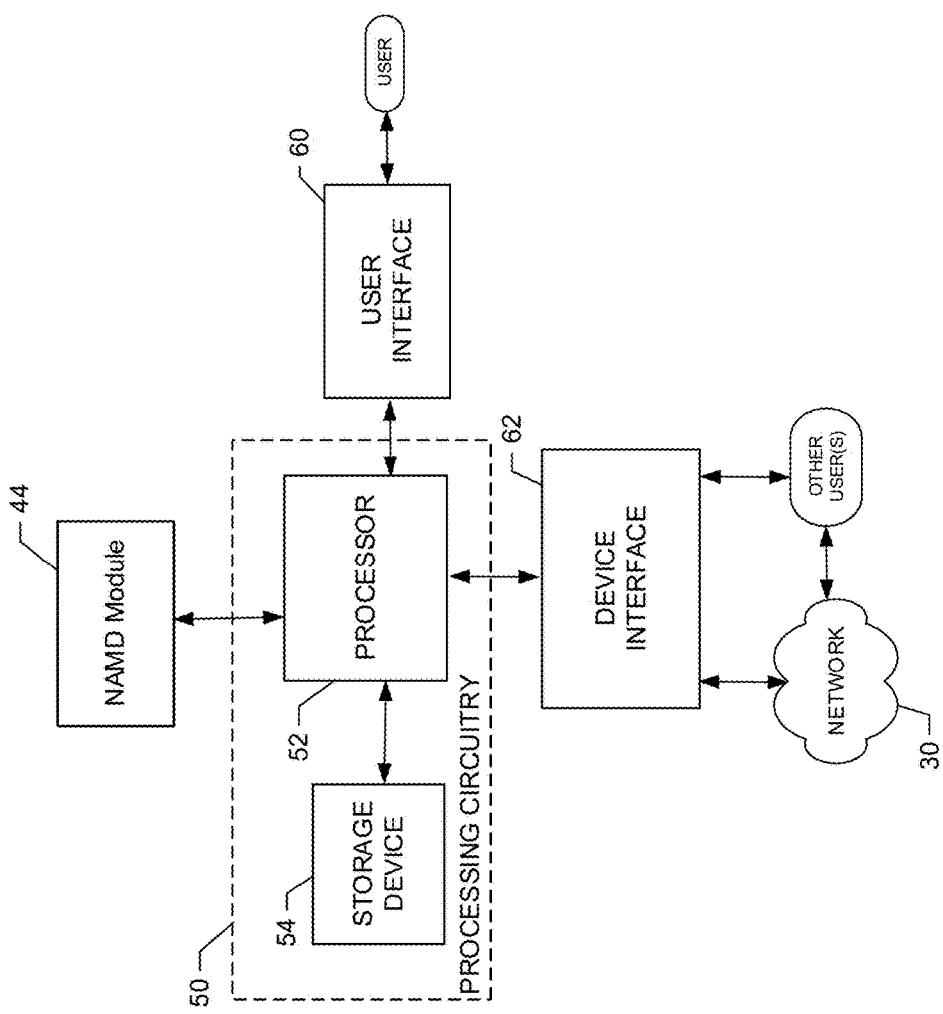

FIG. 2 illustrates an example apparatus for image analysis according to an example embodiment.

Figure 3:
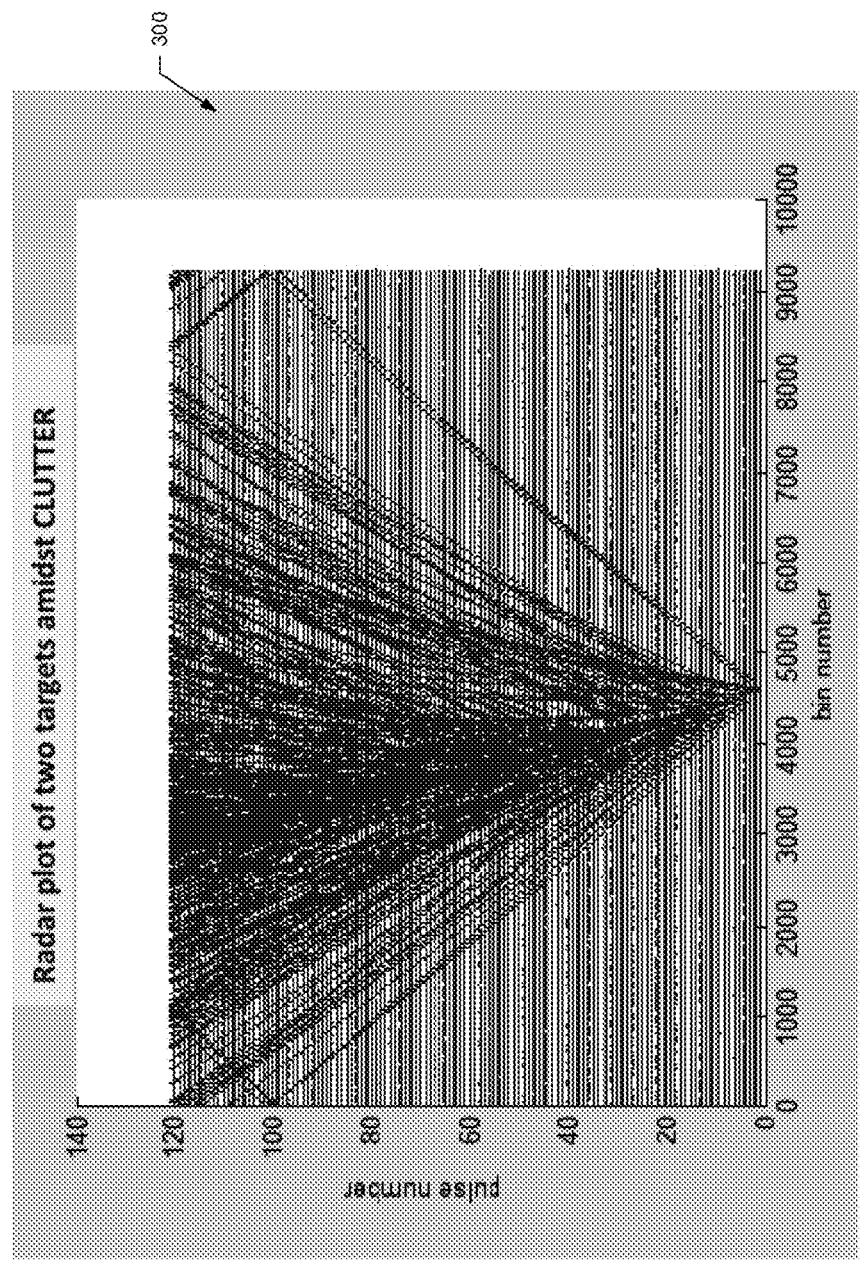

FIG. 3 illustrates an example radar image according to an example embodiment.

Figure 4:
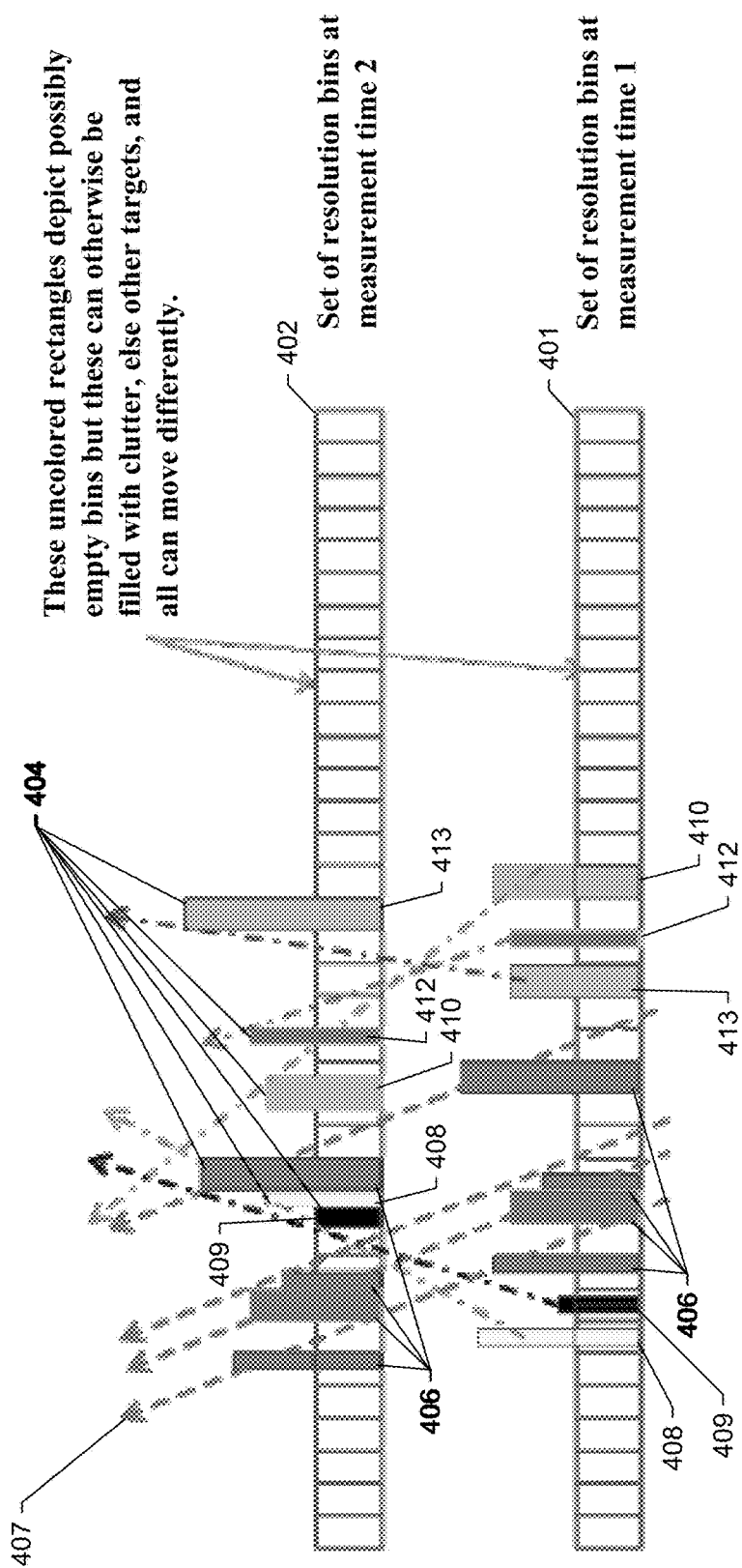

FIG. 4 illustrates a set of bins at a first time and at a second time associated with an image according to an example embodiment.

Figure 5:
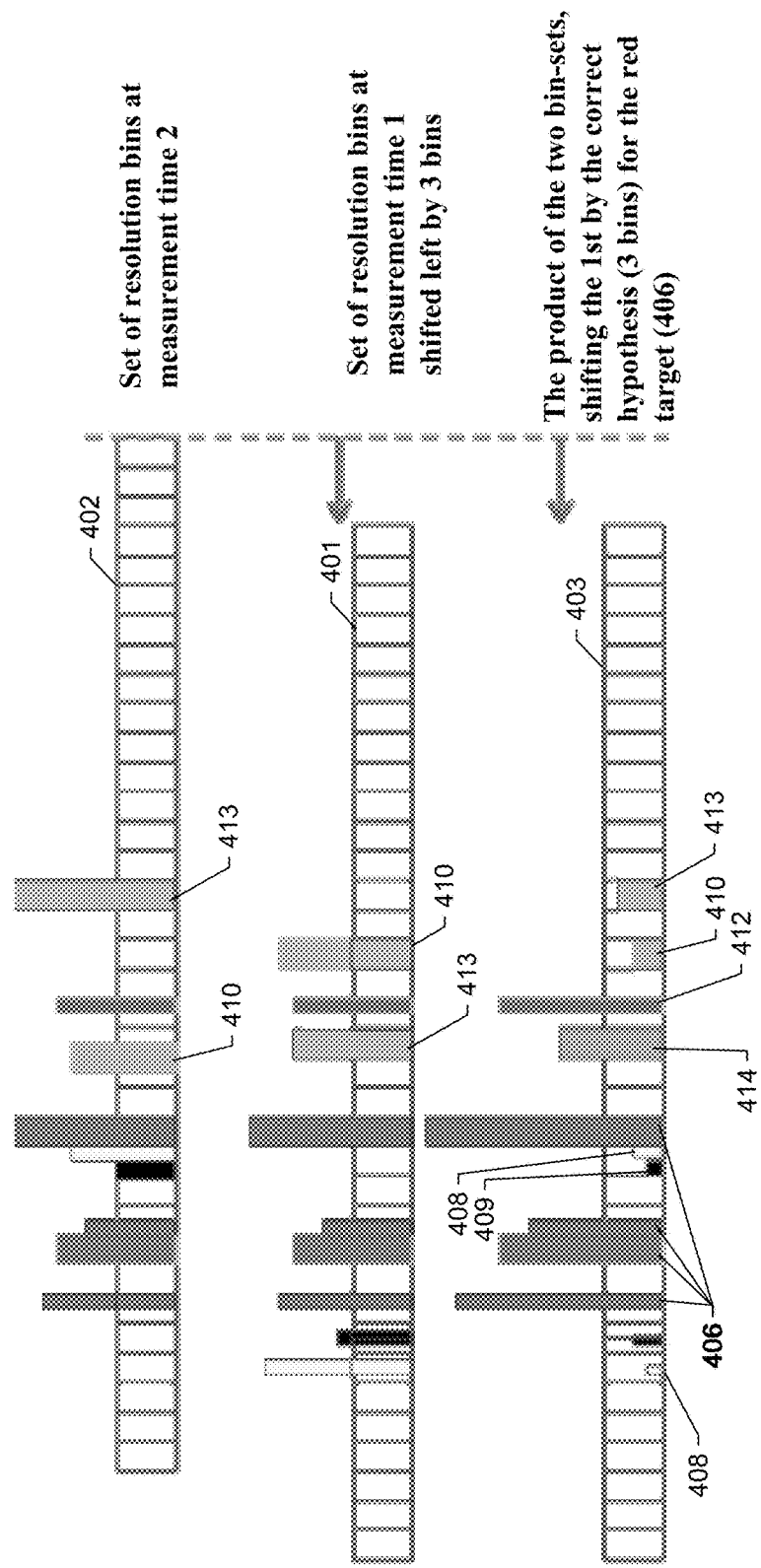

FIG. 5 illustrates the product of aligned bins after shifting for a motion hypothesis according to an example embodiment.

Figure 6:
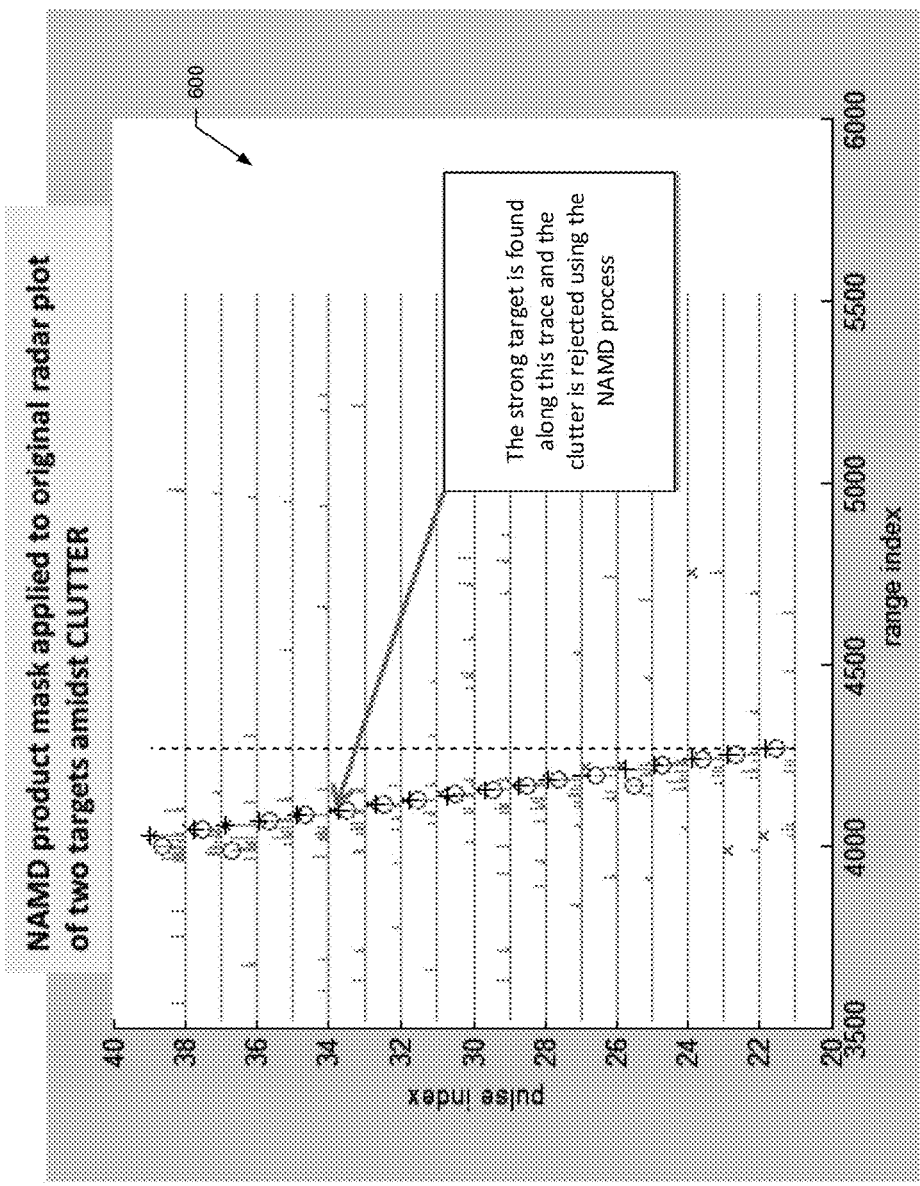

FIG. 6 illustrates the NAMD process applied to a radar plot according to an example embodiment.

Figure 7:
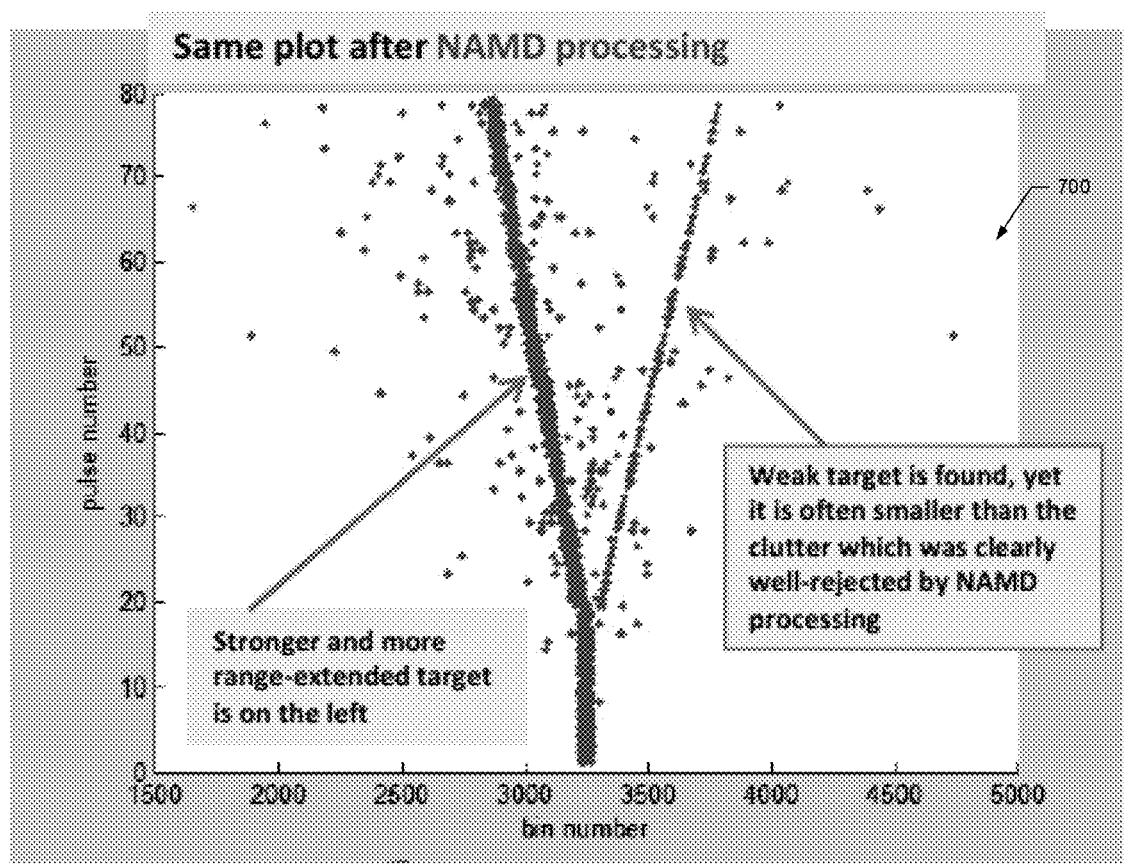

FIG. 7 illustrates a radar plot with the NAMD process applied with a second motion hypothesis.

Figure 8:
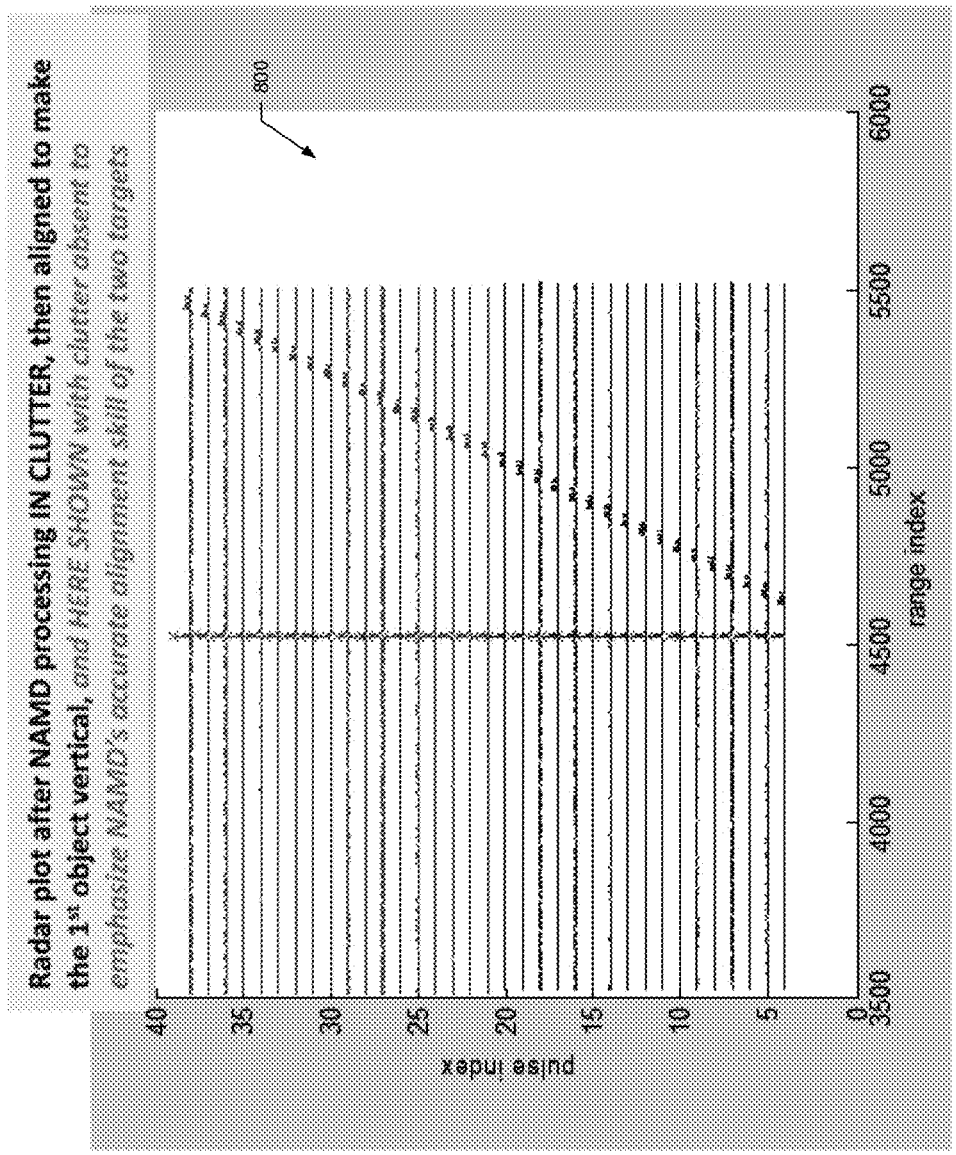

FIG. 8 illustrates a radar plot after NAMD processing according to an example embodiment.

Figure 9A:
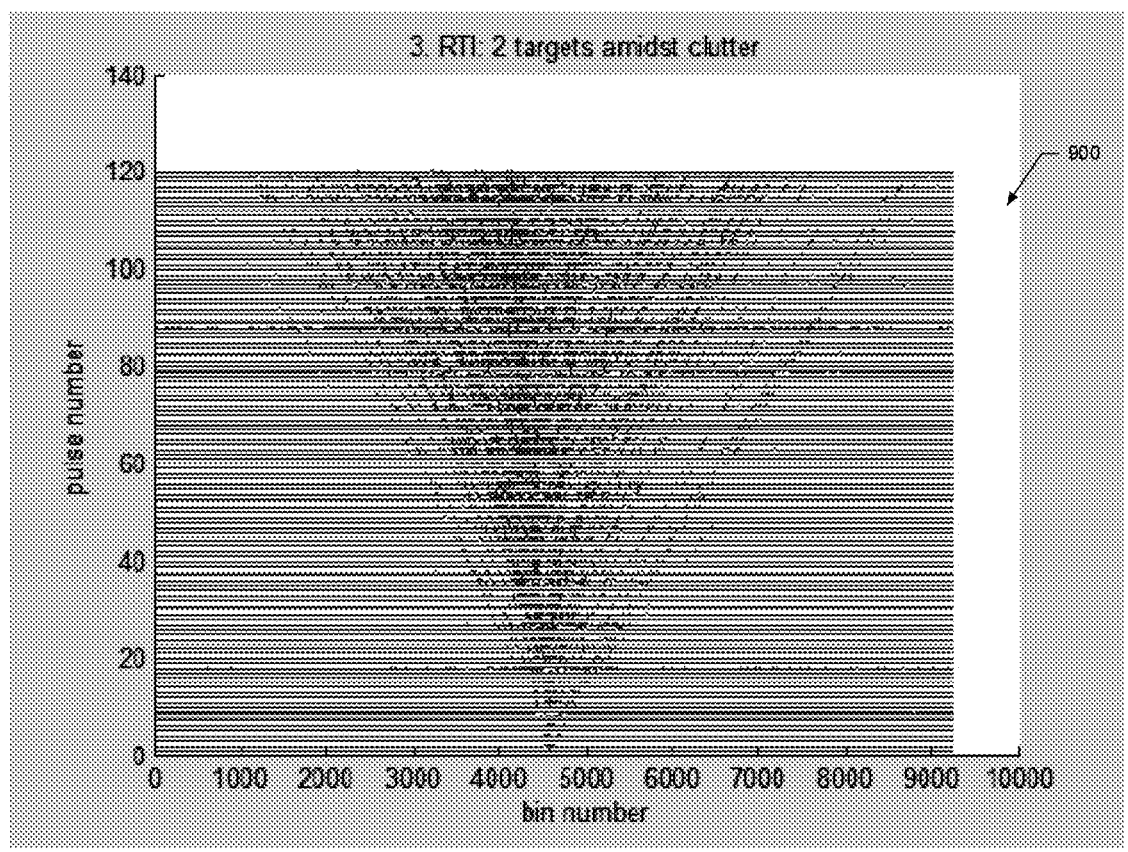

FIG. 9A illustrates a radar plot according to an example embodiment.

FIGS. 9B and 9C illustrate NAMD processing of the radar plot according to an example embodiment.

Figure 10:
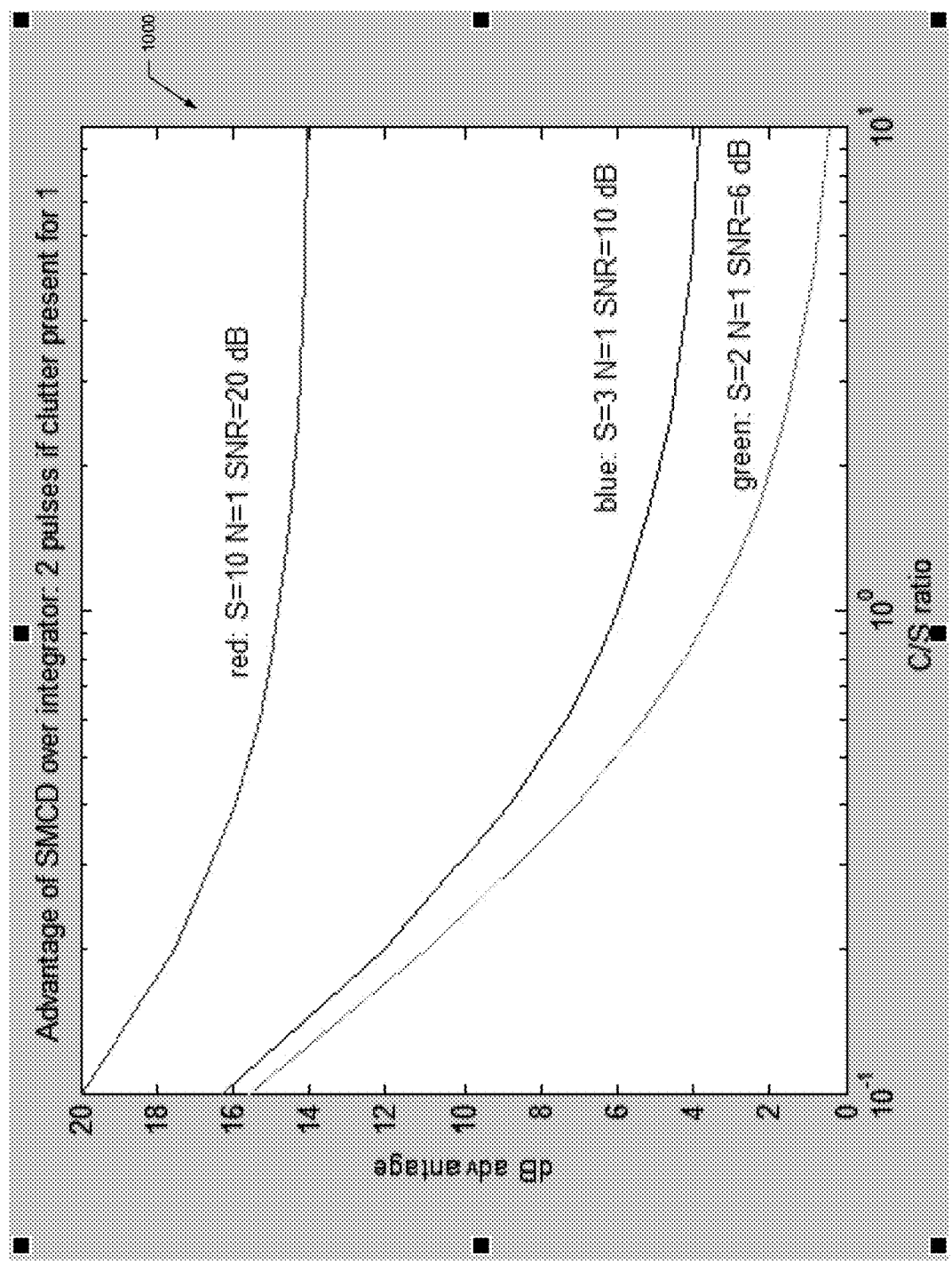

FIG. 10 illustrates a discrimination advantage of NAMD over an integrator according to an example embodiment.

Figure 11:
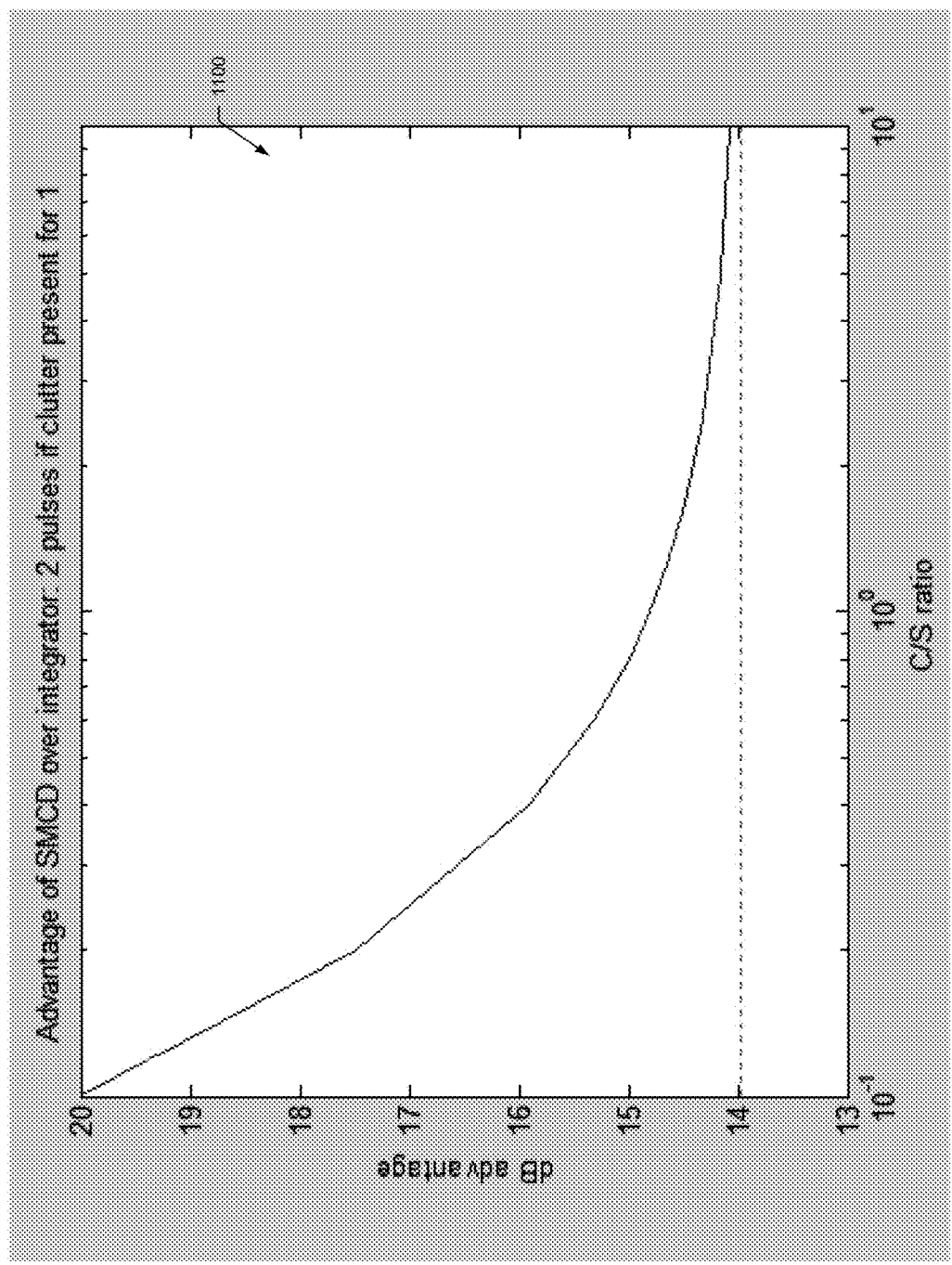

FIG. 11 illustrates a correlator response to a squared signal according to an example embodiment.

Figure 12:
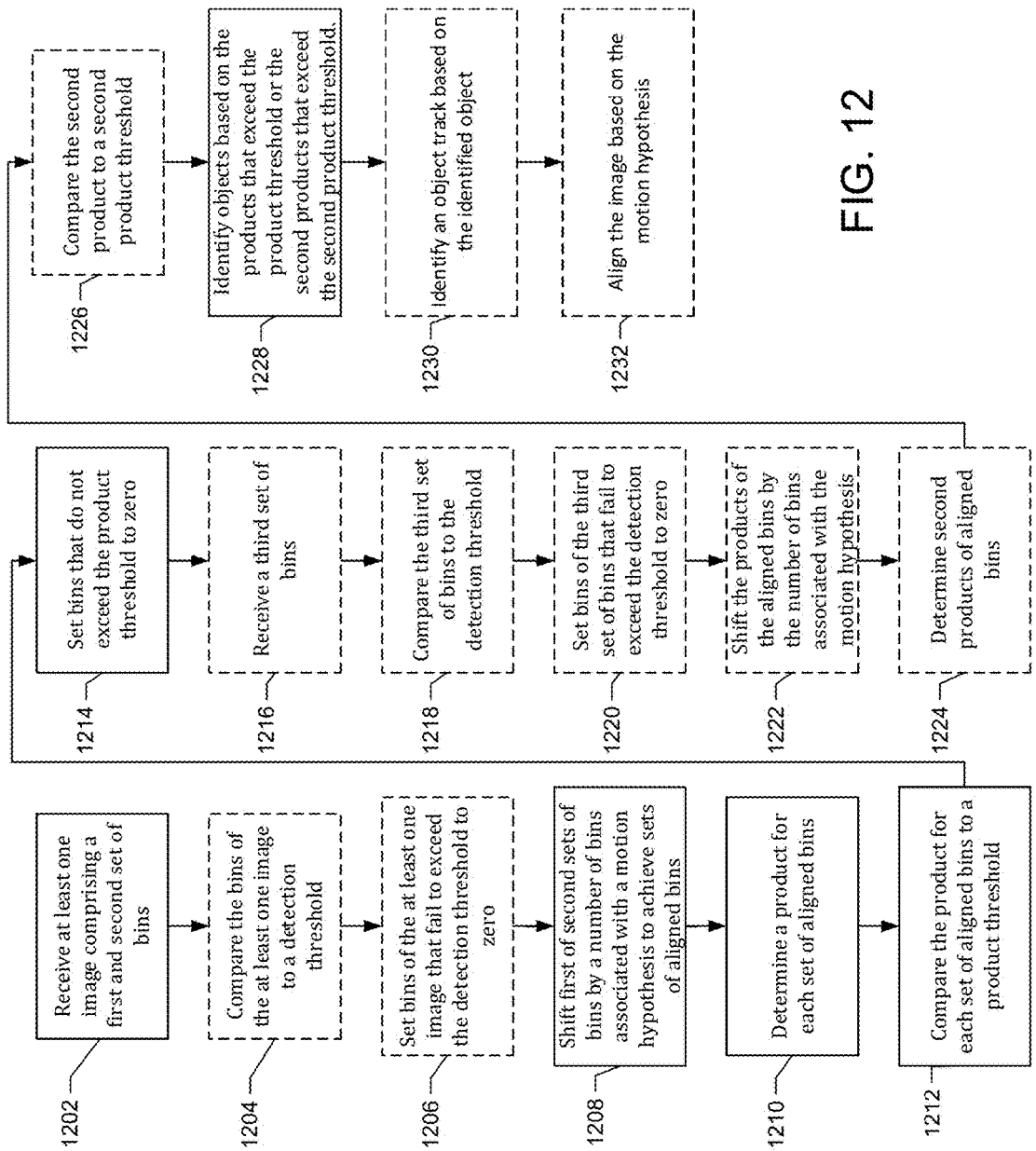

FIG. 12 illustrates a method for image analysis according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As used in herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device may be a component or module. One or more components or modules may reside within a process and/or thread of execution and a component/module may be localized on one computer and/or distributed between two or more computers. In addition, these components may execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or may be operably coupled to, the processing circuitry to modify the behavior and/or capability of the processing circuitry based on the hardware and/or software that is added to or otherwise operably coupled to the processing circuitry to configure the processing circuitry accordingly.

In some example embodiments, a method of image analysis is provided including receiving one or more images, such as radar images, captured over a period of time. Each image may include two or more sets of bins, e.g. the image may be sorted by detection resolutions bins. An image analyzer may include or have access to one or motion hypothesizes (e.g. a velocity hypothesis) for the types of targets that the image analyzer is configured to detect and/or track. The image analyzer may shift the alignment of the bins by a number of bins associated with the motion hypothesis, for example a set of bins may be shifted three bins in a predetermined direction to achieve sets of aligned bins.

The image analyzer may determine products of the aligned bins, by multiplying values of the aligned bins. By multiplying the bins, misalignment of a target may reduce the amplitude of the resultant product, whereas an alignment may result in a product being approximately the square of the target amplitude. The products of each of the aligned bins may be compared to a product threshold. The product threshold may be a value higher than the amplitude of the bins of the first image up to or including a square of the bins of the first image. The bins that meet or exceed the product threshold may be identified as objects in the image. The image analyzer may group object bins based on proximity or matching motion.

The image analyzer may receive subsequent images and iteratively perform the process. In some example embodiments, the image analyzer may set the products of aligned bins that fail to meet or exceed the product threshold to zero, which may remove clutter in subsequent iterations. The image analyzer may use the determined objects to identify an object track in the image. The determined objects may be defined by an object velocity and/or acceleration.

Example System

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates two clients 20, it should be appreciated that a single client or many more clients 20 may be included in some embodiments and thus, the two clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing radar images as described herein.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for image analysis, as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application servers 40), and/or a database servers 42, which together may form respective elements of a server network 32. Notably, although FIG. 1 illustrates a server network 32, it should be appreciated that a server network 32 may be included in some embodiments and thus, the single server network of FIG. 1 is simply illustrative and is in no way limiting to other example embodiments. In this regard, example embodiments are scalable to inclusion of any number of server networks being tied into the system 10. Similarly, a network server may have one or a plurality of application servers 40 and/or database servers 42. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of images (e.g., selection passive or active radar images received from one or more antenna 102, or light images captured by a camera 103, as discussed below). In some cases, these contents may be stored in the database server 42. Alternatively or additionally, the application server 40 may be configured to provide analytical tools for use by the clients 20 in accordance with example embodiments.

In some embodiments, for example, the application server 40 may therefore include an instance of a NAMD module 44 comprising stored instructions for handling activities associated with practicing example embodiments as described herein. As such, in some embodiments, the clients 20 may access the NAMD module 44 online and utilize the services provided thereby. However, it should be appreciated that in other embodiments, the NAMD module 44 may be provided from the application server 40 (e.g., via download over the network 30) to one or more of the clients 20 to enable recipient clients to instantiate an instance of the NAMD module 44 for local operation. As yet another example, the NAMD module 44 may be instantiated at one or more of the clients 20 responsive to downloading instructions from a removable or transferable memory device carrying instructions for instantiating the NAMD module 44 at the corresponding one or more of the clients 20. In such an example, the network 30 may, for example, be a peer-to-peer (P2P) network where one of the clients 20 includes an instance of the NAMD module 44 to enable the corresponding one of the clients 20 to act as a server to other clients 20. In a further example embodiment, the NAMD module 44 may be distributed amongst one or more clients 20 and/or the application server 40.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the NAMD module 44 configured to operate in accordance with an example embodiment of the present invention. In this regard, for example, the NAMD module 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

The application server 40 may be in data communication with one or more antenna 102. The data communication may be wired or wireless communication. The antenna 102 may be configured to capture radar images including a plurality of sensor measurements. The antenna 102 may include a coherent and/or a non-coherent sensor configured to make the sensor measurements.

Additionally or alternatively, the application server 40 may be in data communication with one or more cameras 103. The data communication may be wired or wireless communication. The cameras 103 may be configured to capture moving or still light based images, based on a sensor measurement. The sensor measurement may include heat, visible light, infrared light, or the like.

In an example embodiment, the images may include the radar images, e.g. two or more detection pulse measurements, or light based images, e.g. still or moving images. The images may include one or more sets of bins, such as detection or resolution bins, for a radar image. Each set of detection bins may be associated with a detection pulse. Similarly, the sets of bins for light based images may include pixel rows, pixel blocks, or pixel columns for still or moving images. Each bin may be associated with a value, such as amplitude, range, brightness, contrast, or the like. The images may be received by the application server 40 and stored in the server database 42.

Example Apparatus

An example embodiment of the invention will now be described with reference to FIG. 2. FIG. 2 shows certain elements of an apparatus for image analysis based non-linear association and motion discrimination, e.g. an image analyzer according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus configured for image analysis based on non-linear association and motion determination is provided. The apparatus may be an embodiment of the NAMD module 44 or a device hosting the NAMD module 44. As such, configuration of the apparatus as described herein may transform the apparatus into the NAMD module 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the NAMD module 44, which may be any means, such as, a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the NAMD module 44 as described below.

The NAMD module 44 may include tools to facilitate image analysis via the network 30. In an example embodiment, the NAMD module 44 may be configured to receive at least one image comprising a first set of bins and a second set of bins, shift the first or second set of bins by a number of bins associated with a motion hypothesis to achieve sets of aligned bins, determine a product for each set of aligned bins, compare the products to a product threshold, and identify objects based on the products exceeding the product threshold.

Example Non-Linear Association and Motion Determination

Images may be captured by one or more antennas 102 or cameras 103. The examples provided below are directed toward radar images for illustrative purposes, but are not meant to be limiting. One of ordinary skill in the art would immediately appreciate that the NAMD process may be applicable to sensors other than radar, such as light, photographic still images, motion pictures, or the like.

FIG. 3 illustrates a radar image according to an example embodiment. The radar image may include a radar plot 300 including measures of range in bins indexed along the abscissa of each radar pulse. The pulse number which increases with time appears on the ordinate. Each trace (which are generally curved) in the radar plot 300 may be a trajectory, e.g. range verse time, of a particular object. Two targets are depicted in a dense clutter scene in FIG. 3. One target is a weak target and the other is a strong target. The radar plot 300 also includes 400 clutter points. The strong target, weak target, and the clutter points are each moving with independent velocities and zero acceleration. The image analyzer 100, utilizing the NAMD process, may not need the strong target to succeed with the weak target, as may be necessary in conventional systems. In the present example, the targets may include a few point scatters, which may cause multiple traces for each target. FIG. 3 also depicts many clutter traces. The majority of the curves may be associated with the clutter objects and move independently. Typical tracker/filters utilizing metric association, may fail to detect or track the two target objects in the depicted radar plot 300 due to the number of objects crossing each other. By contrast, the image analyzer 100 utilizing the NAMD process may detect and track each of the objects in the radar plot 300 including both the two target objects and clutter objects.

FIG. 4 illustrates a set of bins at a first time and at a second time associated with at least one image according to an example embodiment. In an example embodiment, the image may include a two-dimensional measurement matrix of range bins versus time. In one example embodiment of the NAMD process, correlations are implemented by taking the product of two measurements. In this example, the product is taken of the range bin signals collected from two consecutive pulses of a sensor.

A first set of bins 401 may be a resolution set of bins captured at a first time, e.g. a radar pulse at time 1. A second set of bins 402 may be a resolution set of bins captured at a second time, e.g. a radar pulse at time 2. Each of the bars 404 may be indicative of a value associated with the respective bin, e.g. signal level amplitude, pixel brightness or contrast, or the like. A first target object 406 occupies four bins, as depicted by the bars 404 of various amplitudes. The first target object 406 moves between time 1 and time 2, therefore the bars 404 associated with the first target object 406 may move together from time 1 to time 2. In the present example, the four bars 404 associated with the first target object 406 have different amplitude values at each time, but remain consistent between time 1 and time 2. The consistency of the amplitude of the bars 404 associated with the target first object 406 is for ease of illustration, and is not required for the NAMD process.

The uncolored rectangles may depict possible empty bins, but may otherwise be filled with clutter or other targets, which may move differently than the first target object 406. The empty bins may include a noise amplitude, non-zero value. In some example embodiments, the image analyzer 100 may compare the bins of each row of bins 401, 402 to a detection threshold. The detection threshold may be a bin value below which the value is not considered to be a reliable indication of an object. Bins that fail to meet or exceed the detection threshold, e.g. bins with values associated with bars 404 that are below the detection threshold, may be set to zero or a nominal value that is effectively zero to reduce noise. The arrows 407 may depict motion of the bars 404 between time 1 and time 2. The arrows 407 may indicate a direction and rate of motion based on the slope of each arrow. A smaller slope may be indicative of a faster motion, since the value of the slope of each arrow may be equal to time 2 minus time 1 along the vertical axis divided by a bin displacement along a horizontal axis. In an instance in which a bar 404 has a zero displacement along the horizontal axis, the slope may be infinite.

The first clutter 408 moves with a different direction and rate than the first target object 406. The amplitude of the bar 404 associated with the first clutter object 408 changes, e.g. decreases, indicative of a decorrelation, with time. The second clutter object 409 moves in a different direction and at a different rate than the first target object 406 and first clutter object 408. The amplitude of the bar 404 also changes with time for the second clutter 409. A third clutter object 410 and a fourth clutter object 412 move differently than the first target object 406, first clutter object 408, second clutter object 409 and each other. The first clutter object 408 and second clutter object 409 may be within the bins associated with the first target object 406, as depicted in the second set of bins 402. In contrast, other clutter objects, such as fifth clutter object 413 may never cross the bins associated with the first target object 406, because the fifth clutter object 413 may be moving faster than the first target object 406 and in the direction of motion of the first target object 406. The depicted first target object 406 and clutter objects 408, 409, 410, 412, 413 are merely illustrative. An image may include multiple target objects and numerous clutter objects. Although, the present example depicts motion of both the first target object 406 and the clutter objects, the NAMD process may be applied utilizing only relative motion and/or random clutter motion.

FIG. 5 illustrates the product of aligned bins after shifting according to an example embodiment. The alignment of the first set of bins 401 with respect to the second set of bins 402 may be shifted based on a motion hypothesis. The motion hypothesis may be defined as a bin shift to achieve alignment of bins of the first set of bins 401 and the second set of bins 402 based on an anticipated velocity of a target object. The motion hypothesis may be based on an anticipated object velocity for one or more targets. The image analyzer 100 may be configured to detect and/or track one or more different objects or types of objects, each having a unique motion hypothesis. The NAMD process may be performed for each motion hypothesis. In the present example, the motion hypothesis correlates to a shift of the first set of bins to the left by three bins.

The image analyzer 100 may determine a product for each of the aligned bins. The product may be determined by multiplying the values associated with the bins, as represented by bars 404. As depicted in FIG. 5, in an instance in which both aligned bins include an associated value, the product may be higher than the value associated with either aligned bin. In contrast, in an instance in which one of the aligned bins include a zero or near zero value the product may be less than the value associated with either bin. In an instance in which the aligned bins include the same object, and associated value, the product may be approximately the square of either of the bins, due to some fading effects. In the present example, the clutter objects 408, 409, 410 and 413 are aligned with near zero bins and are therefore the products of each are significantly smaller than the values of associated with the bins of the first set of bins 401 or the second set of bins 402. The first target object 406 and the forth clutter object 412 are aligned resulting in a product of approximately the square of the value of bins in either of the first set of bins 401 or second set of bins 402. A third clutter object 410 of the second set of bins 402 and the fifth clutter object 413 of the first set of bins 401 are aligned generating a cross-correlation product 414.

The image analyzer 100 may compare the products to a product threshold. The product threshold may be a predetermined value, such as the square of the detection threshold or another greater value, a positive change (e.g. a greater value than the multiplier values of the aligned bins), or a number of highest correlations (e.g. bins with non-zero values). In the present example, the first target object 406 and the fourth clutter object 412 have products which include a positive change and/or would meet or exceed the product threshold of the predetermined value. In some instances, cross-correlation product 414 may also meet or exceed the product threshold.

The image analyzer 100 may identify, e.g. determine the existence of or determine that analysis suggests the existence of, one or more objects based on products exceeding the product threshold. The image analyzer 100 may identify an object in response to of in instances in which each individual bin that exceeds the product threshold. Alternatively, the image analyzer 100 may group bins which exceed the product threshold, such as in an instance in which the bins move together. In the present example, the first target object 406, the fourth clutter object 412, and the cross-correlation product 414 may be determined to be individual objects or a single object having the same velocity. The forth clutter object 412 may be differentiated by other processing techniques, such as integral or Kalman trackers, after the majority of clutter objects are removed by the NAMD process. The remaining clutter objects 408, 409, 410, 413 may be identified as clutter.

In some example embodiments, the image analyzer 100 may receive a third set of bins captured at a third time. The image analyzer 100 may shift the product of each set of aligned bins 403 by the motion hypothesis, e.g. three bins in the present example, and determine a second product. The second product may be determined by multiplying the each set of aligned bins of the product of aligned bins 403 with the aligned third set of bins. The clutter object not aligned with bins in the third set of bins may have small second products. Similarly, clutter product 414 may also have a smaller second product. In contrast, the first target object 406 may have a second product which is approximately the cube of the value associated with the first set of bins 401, second set of bins 402, or the third set of bins. The fourth clutter object 412 may have a large second product similar to the first target object 406, due to having a co-velocity with the target.

The image analyzer 100 may compare the second products to a second product threshold, which may be a predetermined value such as the cube of the detection threshold or another higher value, or a positive change over the multiplier values. The image analyzer 100 may determine objects based on the second products meeting or exceeding the second product threshold. Continuing with the example of FIG. 5, the first target object 406 and the fourth clutter object 412 will likely exceed the second product threshold and be determined objects, however clutter object 414 will likely fail to have a positive change and/or exceed the higher second product threshold and be identified as clutter.

In an example embodiment, the image analyzer 100 may apply the NAMD process to subsequent images. The image analyzer 100 may receive additional images and/or sets of bins captured at different times. The image analyzer 100 may shift the subsequent sets of bins by the number of bins associated with the motion hypothesis. The image analyzer 100 may then, determine additional products of subsequent aligned bins for the second and additional products of the aligned bins and the plurality of bins of the additional images. The image analyzer 100 may compare the additional products of each of the aligned bins to an additional product threshold and identify, e.g. determine whether it is likely that the products are indicative of the existence of, objects based on the additional products exceeding the additional product threshold. In an example embodiment, the additional product threshold may be an exponential value of the detection threshold or other predetermined value or a positive change of the additional product over the multipliers. Since the threshold increases after each iteration, target objects become more apparent after each iteration and the majority of clutter objects are reduced and may have only a brief effect on tracking after one or more products are determined.

In an example embodiment, the image analyzer 100 may identify an object track based on the identified objects from the products of the aligned bins. For example, the image analyzer 100 may determine a track when an object is identified in two or more products of aligned bins. In some example embodiments the image analyzer 100 may identify an object track based on grouped bins that move together from one product of aligned bins to the next.

In some example embodiments, the image analyzer 100 may set bins that fail to exceed a product threshold, e.g. the product threshold, second product threshold and/or additional product thresholds, to zero. The setting of bins that fail to exceed a product threshold to zero may allow for a more rapid filtering of the clutter objects to more quickly and accurately track target objects.

FIG. 6 illustrates the NAMD process applied to a radar plot 600 according to an example embodiment. The radar plot 600 is a result of a radar plot 300 having the NAMD process applied on pulses 21-38 using motion hypothesis associated with a shift (e.g. lag) of fourteen range bins from one pulse to the next. As discussed above, the NAMD process applies the lag, which is the number of range bins shifted, on data between successive pulses before determining the product of the of the amplitude values of the aligned bins is taken for the successive pulses. The first discovered object, shown left of the vertical line, is just above the mean clutter, ranging from 5 dB to 9 dB above the clutter. However it is noted that the NAMD process does not require target objects to have a target signal this much above clutter. The other bins with values may be cross-correlation products, such as a mis-association of one clutter object with another clutter object, disassociation of one scatter on a target object with another scatter on the same target object, or mis-association of one scatter on a target object with a nearby clutter object.

In an example embodiment, the NAMD process may be reapplied using a different motion hypothesis, e.g. shift or lag, to find various motions which are anticipated to be included in the radar image. Each motion hypothesis may be associated with a different velocity and, therefore shift or lag of a different number of bins.

FIG. 7 illustrates a radar plot 700 with the NAMD process applied at a second lag. Radar plot 700 includes radar plot 300 after NAMD processing in which the strongest fifteen correlations are kept, e.g. a product threshold of fifteen correlations, for each pulse pair, e.g. set of bins. In the present example, detected magnitude values are used for the NAMD process. However, one of ordinary skill in the art would immediately appreciate that other values may be used.

The strongest scatter on the weak target was often 10 dB less than clutter. The range extent utilized in the present example affords a significant opportunity for cross-correlation, e.g. cross-scatter correlation, when using a small shift, such as nine bins per set of bins or pulse pairs. The nine bin shift was the optimal shift amount for determination of the weak target object. It is noted that unlike integration, these bins shifts do not accumulate across pulses, integration of the present example may require compensation reaching over 540 bins.

FIG. 8 illustrates a radar plot 800 after NAMD processing according to an example embodiment. The radar plot 800 has been aligned to make the first target object track vertical near the 450° range index. The target object is approximately 6 dB to 9 dB above the mean clutter. However, weaker targets may also be detected and tracked using the NAMD process. For example, the second target object, which is represented by a trace that leans to the right and is 3 dB below mean clutter. The alignment depicted in radar plot 800 utilizes the alignment found in the cluttered scene with the clutter absent to clearly depict the quality of alignment of both the strong target object and weak target object.

FIG. 9A illustrates a radar plot 900 according to an example embodiment. The radar plot 900 includes two targets among 500 clutter points. FIGS. 9B and 9C illustrate NAMD processing of radar plot 900 according to an example embodiment. FIG. 9B illustrates the product 910 of radar plot 900 after application of a two pass NAMD detection mask comprised of ones and zeros. The product 920 of FIG. 9C depicts a close in view of a portion of FIG. 9B. The darker points in the products 910, 920 are a Signum function, e.g. a zero-one mask function after the two NAMD passes. The first NAMD pass uses pulses k, k+1, k+9; the second NAMD pass uses k, k+1, k+2 0, where k is the "present" pulse. The lighter points in the products 910, 920 are original range-time plots amidst clutter after multiplying by the Signum function. The NAMD process successfully detected seven scatters of the weak target amidst the clutter and the product 910, 920 is ready for association and tracking. It is noted that the vertical scatters, one by one, are already tracked.

The NAMD process exploits a combination of signal properties and motion to detect objects amidst backgrounds comprised of discrete clutter, in which both the objects and clutter may be moving independent of one another. Target detection in sufficiently dense clutter of this kind is historically unattainable with inadequate signal to clutter (S/C) ratio in sensor resolution cells. NAMD significantly extends the capability to detect, associate, track, and motion discriminate by performing in dense scenes and at weaker S/C ratios where conventional detectors, associators, and trackers fail.

The NAMD process finds weak targets in discrete clutter and swiftly associates targets, as well as clutter discretes, to enable prompt accurate tracking of all objects, which may lead to revolutionary advancements in detection and tracking.

After NAMD associates and tracks one or more targets, a Kalman filter may be exercised, though in many cases the Kalman filter may be unnecessary. The NAMD process may be performed on target objects which are fully noncoherent. The NAMD process succeeds with targets having any degree of coherence, amidst clutter discretes which may have any degree of coherence, spanning from noncoherent to fully coherent. The scene to be processed by the sensor may be a dense collection of independently moving targets, or a scene having a plurality of targets in a dense arrangement of independently moving clutter discretes, such as in the chaff problem, in which a missile tracks an airborne target. In the case of coherent radar, the image scene may be comprised of range bins, Doppler bins, or a 2D array of range by Doppler bins. NAMD also applies to images, photos, movies, or the like, where objects in a static image, e.g., a photo have somewhat, but not perfect, linear or curved shapes amidst a fairly dense random background. Because the NAMD process associates quickly, the NAMD process handles various motions, including a weaving target.

In an instance in which clutter is amplitude-competitive with the target but sparse in the scene, conventional detection and association methods may perform. However, detection and association methods may not perform with the same speed and accuracy as the NAMD process. When the number of targets in a clutter-free scene is not too large, specifically when the scene is not too target-dense, again conventional detection and association methods may perform, as in the case of two crossing objects shown in FIG. 3. However, in dense scenes as in FIG. 6, there are many opportunities located within a dense space by time region to mis-associate detections among target and clutter (or other target) objects. This is illustrated by eight objects having seventeen crossings (circles in FIG. 6). Confusion may be unavoidable since association is principally based on the Euclidean distance between objects, and too many object pairs have zero separation (red circles) in dense scenes.

In dense cases, conventional methods fail often, and these methods are further troubled by low S/C levels, whereas the NAMD process succeeds in spite of Euclidean distances frequently becoming small as objects cross one another. More recent schemes embrace track-before-detect principles, and may offer improvement; but scene density and low S/C also limit these schemes. Distinct from track-before-detect, thresholding above noise may be performed early in any of the methods discussed including the NAMD process. One of the novel features of the NAMD process is the NAMD process's nonlinear operation that utilizes resolution like accuracy to associate by multiple motion hypotheses before the NAMD process detects objects.

Sensor measurement may be viewed as a discrete-time sequence of measurements, each with a discrete spatial measure of the scene. Resolution bins are naturally discrete, as are the pulses in sensors. When one target and no other objects or clutter are present, a sequence of bin measurements may ideally be a set of samples of a stationary random process. This idealization occurs in an instance in which the target presents a steady response and does not move with respect to the resolution bin as pulses (time) proceeds. In nearly all other and more complex cases, a non-stationary random process unfolds in any fixed resolution bin. Motion may be sufficient to make any one bin produce a non-stationary sequence. Even if some particular object, Q, is stationary in a bin across time, that bin may produce a non-stationary sequence whenever the target response is time varying, caused by amplitude and phase variations. Non-stationary may result when the signals defining Q fluctuates, or when other objects, cross the resolution bins of Q. In an example embodiment, including additive stationary bandlimited white noise, there may be non-stationary random processes unfolding in many resolution bins, especially those with target objects. The means variances and entire probability density functions may be non-stationary as one or more objects move through resolution bins. As such, the NAMD process may include an optimal algorithm to separately maintain the resolution bins across some time interval while performing association across time and space. The NAMD process may include function arguments which span space in a sufficient dimension, and also time in sufficient duration, to accomplish association.

The NAMD process may include some similarity to a cross-correlator acting in space and time. However, the NAMD process is not a correlator. A correlator may fail in most scenes because it integrates the signal plus clutter across space into a singular composite assessment, which may have little utility in busy scenes. Since the cross-correlator has but a single degree of freedom, namely a spatial lag for bin sets taken, for example, at two distinct times, a cross-correlator may not be capable of detecting and tracking two independently moving objects having comparable sized signal responses. Since the lags associated with the motion hypothesizes are different, only one movement would be matched, and the cross-correlator's sum across these bins may smear the cross-correlator output into a composition of the first object's matched response with the remaining object's mismatched response.

The NAMD process utilizes the spatial product, e.g. a summand of a discrete summer, to accomplish the association, without concluding the operation with integration. The spatial product retains resolution and excludes the spatial integration operator, arriving at a space-time correlation procedure. In doing so the NAMD process may retain all the information in the scene, namely resolution and the scene time history.

In an example embodiment, the cross-correlation of two discrete processes, $x(n)$ and $y(n)$, has a spatial lag, m between them. The cross-correlator for lag m is the summation across n of the product $x(n)$ times $y^*(n-m)$, where the conjugate is needed for complex processes. The non-stationary of independently moving objects inhibits a correlator from addressing the problem, save for an approximate result in simpler cases, wherein just one dominant object is taken amidst others. Yet, for a single object, even one moving with reference to the sensor, a correlator's spatial lag may follow the object's movement across time. In this manner, a single object may be followed via a cross-correlator through K plural observations with K−1 lags without combining or altering the K sets of resolution bins. Based on this, the NAMD process "prepares to correlate" more than one object by avoiding the summation operator of the cross-correlator. As such, the NAMD process may utilize the summand of the cross-correlator. Any one summand formed between two time samples has N bin products, when each measurement has N resolution bins. The summand function arguments span space in a sufficient dimension, and for this step the arguments span time in some duration. Each of the N bins is still present after a product is formed of a pair of measurements (pulses). The product summand, $x(n)$ times $y^*(n-m)$ may be utilized to accomplish the dense scene and low S/C objectives. The NAMD process may build this product function for each lag m in a set of hypotheses that the image analyzer 100 expects to encounter. In other words, the NAMD process begins in the manner of a cross-correlation operation, but does not form a cross-correlation integral or a summation.

The motion hypothesis, of the NAMD process, may be a spatial lag for one dimensional measurements taken at K times, similar to the lag hypothesis of a cross-correlator. Since the measurement bins are discrete, the NAMD process implements just the summand of a discrete cross-correlator for each lag m in a set, Sm.

In contrast to systems employing a track-before-detect algorithm, the NAMD processes may determine an explicit association, to be assigned by motion hypothesis, before any other operation occurs, with the exception of optional detection thresholding above noise. In a single product function, the NAMD process may also include a recursive operation wherein a product may be taken of pulses k with say k+1, then another product of pulses k+1 with k+2, etc., resulting in N bin products in each of K−1 product-bin-sets, after recursively forming these products through pulses 1 through K. The association decision for the K pulses may become the chosen sequence of K−1 lags which implements the product functions, and this association decision actually precedes the formation of these K−1 product functions of bin-sets. The actual object motion may be expected to be smooth, and the association decision may be made to coincide with smooth motion simply by selecting such motion as the motion hypothesis. Thus, the motion to be tested may be perfectly smooth, and advantageously gives the NAMD process an accuracy advantage. In summary, all of the resolution may be retained in these products across K pulses. Since a particular motion hypothesis already accompanies this sequence of K−1 bin-sets, any object having the presumed motion which is stable enough may produce recognizable products for some or all of these K−1 bin-set product functions.

Sufficient stability in most cases may be anticipated, and at a minimum, resolution may be adjusted, in some cases with the measurements already in place, to match the stability requirements. Current trackers may expect a certain measure of stability from realizable, not chaotic, movements. Moreover, many coherent sensors expect much more, namely coherency, which is much more demanding than the stability within a resolution bin. It should be appreciated that the NAMD process may optionally operate coherently with appropriate motion hypotheses, or may operate non-coherently with less stringent motion hypotheses. In instances in which the sensor design intends to succeed with coherent integration across M pulses, the NAMD process may be stable in resolution bins (at least among bins expected to be coherent for M>K pulses). Recurring recognizable signal response in a bin (stability) may be much more likely to be exhibited by a moving object than prolonged signal coherence in a bin. However, even a non-coherent version of the NAMD process operating on a coherent sensor is a powerful associator that demands only reasonable and brief signal stability of the targets in most circumstances.

The NAMD process may utilize only a few pulse-pair products that exhibit a given object uncontested by other crossing objects. An example dense scene may cause traditional trackers to fail as too many crossings occur, e.g. too often. In an instance in which there is at least some reasonable space (in time and in measurement dimension) between ambiguous crossings, this same dense scene may exhibit enough evidence, along with a NAMD process pre-assigned motion hypothesis, to identify an object present having this motion. Additionally, distortion may be much smaller with the NAMD process due to the stability and resolution that exhibits the track within the NAMD process, and other objects. While some objects may cross the given object at various times, the objects do not hide the cleaner, resolution-like NAMD process track.

The NAMD process may form a longer string of products based on three or more pulses, which may not necessarily be consecutive pulses p, for example, the p1, p3 and p4. Three-pulses may form a double-product which results in more product erosion due to motion mismatch as compared to a single product. The erosion of the product is exponential (geometric progression) with product dimension. Whereas, the mismatched object has product erosion, the stable and motion matched object yields a geometric progression of increasing evidence of object presence (product increases exponentially with length of a multi product formation), which may constitute a very significant distinction between a matched motion and a mismatched one.

In an instance with matched motion, there may be exponential growth in the product, e.g. on the order of Ah for h pulses of typical per-pulse amplitude, A in a particular bin-product sequence. With mismatched motion, there may be exponential deterioration in the product, e.g. the product is on the order of $A^z b^{h-z}$ for z pulses of typical per-pulse amplitude, A combined with h-z pulses of smaller, at times empty, bin amplitudes b in a particular bin-product sequence of h pulses. Here b<<A may arise when h-z bins are nearly empty while h bins have some object having amplitude A.

In an instance in which object two is to be motion-mismatched having a number E of bins, a cross product response of a single object, object two, may occur. Two portions of these bins may be multiplied when hypothesis lag, $m_1$ is used to match object one and where m1 is less than some function, $g(m_1, m_2, E)$. And this condition leads to cross-products of object, in spite of the motion hypothesis being mismatched to object's two's motion. The production of these cross-products may not be temporary for a fixed motion hypothesis, unless the object changes its already mismatched motion or its signal response changes (as in radar fluctuation). In an instance in which $m_1$ is equal to or larger than $g(m_1, m_2, E)$, the NAMD process may not result in any such cross-products of object two, at least not of object two alone. As such, if one of the lags within an h-pulse product is chosen large enough, e.g. one lag exceeds $g(m_1, m_2, E)-1$, then the single-object cross products may be non-existent, in an instance in which the lag of the "last" multiplier exceeds that object's dimension, while also considering its motion, $m_2$. In other cases these single-object cross products may at least be substantially diminished in general, in an instance in which the lag of the "last" multiplier causes the product to reaches past object two finding an empty bin that diminishes the product.

The cross-products produced by one object that do arise may become diminished in a mismatched motion of the large object if the product is further multiplied with empty bins. The image analyzer 100 may select a sufficiently long elapsed time, $(h-1)T$ where T is a uniform pulse interval and h is the last pulse used in the NAMD products. Temporary cross-products may arise when the "last" multiplier having the most remote reach finds yet another object (three), especially if object three is large.

The image analyzer 100 may retain each of the NAMD products that lie on paths that agree with the selected motion hypothesis; and reject each of the NAMD products that lie on other, mismatched, paths. The NAMD process may result in a matrix of points in space by time, which are not yet associated into two groups, e.g. 1) those points on paths which agree with the selected motion hypothesis and 2) those points on paths which disagree with the selected motion hypothesis.

Depending upon how many points remain in the NAMD processed scene and the clustering arrangement (density) of the points, different association methods may be applied. For example, Euclidean association or integration may be applied to the NAMD processed scene. Integration may be coherent or non-coherent as appropriate. However, these subsequent operations may not be needed and may be utilized in instances in which the NAMD process has been exhausted. The NAMD process may reach full potential when recursively performing a number M of NAMD process passes on the image data.

In an example image including two objects, the cross-products that arise generally yield a temporary increase of the product in a mismatched motion of a large object as the bins associated with the object are multiplied with still larger bin amplitudes of some other large object or objects. The increase in product in a mismatched motion may be temporary because the motions are independent, and thus these kinds of alignments are not persistent. In contrast, the motion-matched object exhibits for a steady object a product amplitude of $A^h$ for h pulses of typical per-pulse amplitude, A in a particular bin-product sequence. This correct motion hypothesis may have a product that overwhelms products of stronger objects that are motion-mismatched.

Comparing the NAMD process to coherent and non-coherent integration as a mechanism for improving low S/C detections as low the NAMD process impacts the task of association and track formation. Note the comparison is not the S/C ratio in a bin after the bin is integrated, but the ability to associate by various magnitudes in distinct schemes. While integration lengths may be longer, the present example includes an integration length of 3. Contrast the evidence present in a 3-pulse product (a double-product) of the NAMD process with that in a 3-pulse summation. For a matched motion of a stable fairly steady response, the product is $\sim A^3$, while the sum is $\sim 3A$. For a mismatched-motion of a would-be stable (if motion-matched), but bin-moving response, the product is $\sim\eta*A2$, while the sum is $\sim 2A+\eta$ where $\eta$ may be the response level indicative of noise. The Neyman-Pearson hypothesis test between the NAMD process double-product is $(\sim A^3$ vice $\sim\eta A^2)$, which has the generally large ratio $A/\eta$. The Neyman-Pearson hypothesis test between the non-coherent integration of 3 pulses is $(\sim 3A$ vice $\sim 2A+\eta)$, which has a much smaller ratio for integration. Here $\sim 2A+\eta$ is approximately $\sim 1.5$, when for example $A/\eta$ exceeds 3.2 (10 dB). Further, when the motion is mismatched in both of the double products, the result may be $\sim A^3$ vice a much smaller, $\sim\eta^2 A$, which has a very large ratio $A^2/\eta^2$, especially as compared to integration. Integration compares $(\sim 3A$ for matched vice $\sim A+2\eta$ for mismatched), yielding a ratio of $\sim 3$ amidst noise (or a mean-difference of 2A amidst 3×2=6 samples of noise after differencing the two hypotheses). The NAMD process may have a very powerful association benefit amidst the many non-stationary processes of multiple, independently moving, objects. The NAMD process detects the mismatches vice the matches exponentially, thus very quickly. Assuming reasonable caution in decision making, and reasonable object stability assumptions spanning short time (a few pulses), the fidelity of the track may be on the order of the resolution at each iteration.

In an instance in which the nearest distinctly moving object is not too close to the location of a desired object's bin-product on a given pulse-pair, which may occur somewhat frequently even in a dense scene, the accuracy of the desired object's movement, assuming a short-term stable response, may be observed with accuracy near the Cramer-Rao limit. This limit is the resolution divided by the square-root of signal to (SNR) in the bin. The fidelity may be observed in those circumstances by exploiting zero-padding in bins that arise from Fourier transforms of sensor measurements. Interpolation schemes may be useful where Fourier transforms are not taken, for example, with phase-coded waveforms.

The NAMD process association may have resolution-like behavior with Cramer Rao-like location accuracy at certain pulse-pairs (or multiple-pulse products). This Cramer Rao-like location accuracy yields a resultant Cramer Rao-like motion accuracy. A NAMD process track may be formed of resolved stable portions of a moving object, and in accepting data vice censoring obvious crossings, the NAMD track performance approaches the location accuracy of resolved bins.

The NAMD process may be a nonlinear scheme that associates before it detects. The speed of track discovery owing to the exponential nature of NAMD process products may be a difference between NAMD process and track-before-detect (TkBfDet). The track, if found to be present for a given motion hypothesis, may already have the bin location and motion description of the motion hypothesis, which is confirmed (discovered by the sequence of products) with resolution-like and better quality as discussed. The accuracy and certainly speed may not be observed in traditional TkBfDet schemes due to Euclidean association and ambiguity in the dense scenes, even though the final detection, being postponed in a TkBfDet algorithm, does assist accuracy somewhat and does remove some mis-associations.

The NAMD process tracks may be formed of individual resolved portions of a moving object, not just as the object as a whole. Object sub-track granularity is improved, also precluding certain mis-associations by present methods between portions of a stable object. The NAMD process may find other objects by the same methods, and may then compare object tracks, noticing when the objects cross one another. The crossings may be used in a second pass of the NAMD process, and in other ways, whereby crossings are then censored from products and from decisions regarding products. The result may be similar to Cramer-Rao like location and motion performance in spite of the scene being reasonably dense. Additionally, the exponential behavior of the NAMD process offers substantial benefit in low S/C conditions. The NAMD approach may more quickly arrive at robust results having more accuracy in dense scenes burdened by low S/C, than coherent integration.

Any object having a velocity of the selected motion hypothesis may be stable enough to produce recognizable products for some or all of the K−1 bin-sets, as discussed above. In an example embodiment, the motion hypothesis selected for the K pulses may be a single motion hypothesis, which may be a constant bin-shift between uniformly-time-spaced pulse pairs if little acceleration is anticipated (e.g. a fixed velocity). In some example embodiments, the motion hypothesis may address acceleration, or non-uniform time-spacing as well, by varying the bin-shift with pair-index, k.

In an example embodiment, a single object may not present association ambiguity across time, with exception for mis-associating over-resolved pieces. The mis-associated over-resolved pieces may occur as motion affects signal properties of individual portions of the moving object. In an example embodiment of the NAMD process that uses signal and motion properties, the NAMD process enables detection of objects amidst cluttered backgrounds, when objects and clutter are located in resolution cells, or in pixels of an image. Significantly, sub-clutter visibility may occur even when the conventional alternative is to elevate detection thresholds, as in CFAR, which eliminates clutter but also eliminates targets having intensity like the clutter. For example, sub-clutter visibility, may be accomplished in an instance in which there is relative motion between some desired object and clutter, or in an instance in which there is chaotic background scenery amidst smooth curves of interest in a static image.

In addition to detection, moving objects may be discriminated by a signal and motion correlation detector (SMCD), e.g. the image analyzer 100 utilizing the NAMD process, by organizing the objects into distinct groups on the basis of motion hypotheses. The groups may identify and enable tracks to be formed per the motion hypothesis in dense clutter conditions, and similarly, the groups enable smooth curves to be located within a static image. In this manner, the NAMD process enables multi-target tracking of many crossing tracks, which has been challenging for traditional tracking systems vary due to mis-associations of measurements to tracks.

In an example in which there is an absence of acceleration, the NAMD process may be a velocity discriminator, isolating tracks having a common velocity. In static scenes the NAMD process may isolate lines or smooth curves among several lines or curves, and determines the line or curve's orientation. These objectives may be achieved by a sequence of nonlinear operations that utilize correlation present in sensor measurements across space and time, or equivalently, by using correlation in imaged pixels across space and space in static 2D scenes. Signal correlation may be performed using any combination of signal properties, including but not limited to amplitude and phase, and similarly gray scale, and/or color in images. When motion is present, motion discrimination is achieved as a byproduct of the sequence of nonlinear signal correlations, performed for selected motion hypotheses.

The NAMD process technique may enable detection of objects, for example, one or more targets, amidst background clutter, all of which are located in resolution cells (or in pixels of an image). The object detection in a radar image may be accomplished in an instance in which either the target or clutter moves relative to the other. In static images, the object detection may be accomplished in an instance in which there is chaotic background scenery amidst smooth curves of interest. Detection may also occur in an instance in which motion uncertainty and clutter are both sufficiently large to deny detection by conventional detectors, including detections employing integration in its many forms. Integration may be effective in instances in which the number of motion hypotheses is small, e.g. 2-3; otherwise, the overall false alarm rate elevates toward unity, which may leave little room for confident detections.

In addition to detection, objects in radar and similar applications may be discriminated into groups, which are distinguished by motion hypotheses. For example, the NAMD process may utilize velocity hypotheses to achieve velocity discrimination.

In an example application of the NAMD process that includes radar image sensor measurements in which motion is present, detection and discrimination objectives may be achieved in the NAMD process by correlating the sensor measurements across space and time. As discussed below, correlation as performed in the NAMD process is not the same as a conventional correlation, such as a statistical examination of correlation between a given pair of time functions.

An example application of the NAMD process was discussed above in reference to FIGS. 4 and 5. In addition, to the motion-induced discrimination due to signal correlation and clutter decorrelation, the signal may fluctuate slowly in an instance in which it is correlated on the brief time between two successive measurements. Yet, the clutter may fluctuate quickly in an instance in which the clutter is chaotic on this same brief time interval. In some instances, integration across time relies on this phenomenon to improve S/C ratio, and to be successful in discriminating target bins from clutter bins. In an example embodiment, the target may be correlated for some number of measurements, which may imply that the target will remain correlated after just one measurement time has elapsed. A relaxed correlation requirement is sufficient for NAMD process product operation, whereas the integrator generally needs much longer target correlation. As explained above, clutter decorrelation is advantageous and required in integration. However, while it is advantageous, it is not required of the NAMD process.

As discussed above, the product function may be utilized in a convolution integral; and also in a correlation, as in the cross-correlation of two random signals. However, there are two distinctions between the convolution integral and the product operation of the NAMD process. First, when convolving a time-function a(t) with time-function b(t), one function is flipped (time reversed) before passing it across the other, forming the product function, and then integrating the product function from, for example, time zero to the present time, t. In the NAMD process, neither function is flipped (time reversed). The second NAMD process distinction from convolution: integration is not performed. Rather, the NAMD process uses the un-flipped product function, each with a hypothesized lag (e.g. motion hypothesis), on each of the bins, without integration to produce a new sequence of bins versus time containing signal products, as depicted in FIG. 5. The NAMD process may apply as many motion hypothesis lags, and thus product function sequences, as there are motion hypotheses to be handled, due to the a priori motion uncertainty. The image analyzer 100 may build a new image (bins across time) for each motion hypothesis. Thus, the NAMD process may also differ from cross-correlation, since the NAMD process does not perform integration of the product function.

With a selected lag, a product function is formed on each pulse pair, thus a new product function is available on every pulse beginning with the second pulse and thereafter. The sequence of these product functions with an ideal motion hypothesis may result in a sequence of signal products in a stationary, or nearly stationary, range bin. In an instance in which, the selected lag is a poor match to the actual motion between pulses, this object, and any other object, also mismatched and residing in any other bin, may be misaligned in the sequence of products, leading to smaller and often negligible signal products. In an example embodiment, signal cross-products may also be present in these product functions, which may arise in different ways. Generally, the frequency of occurrence of cross-products having significant product-signal levels may depend on the density of objects in the scene, the objects relative locations and relative motions to one another, and upon the signal strengths of those objects.

For example, a moving target having significant signal levels within a set of bins that is wider than the hypothesized lag in bins per pulse, may give rise to cross-products which are the result of this target alone. These cross-products arise as the signal in bin $n_1$ aligns with some other signal in bin $n_2=n_1+L_1$ where $L_1$ is the lag hypothesis. These cross-products may be self-object cross products, which may be caused by a product response. The cross product response may be partly due to unexpected (actual less hypothesized) motion and partly due to the relative location of any two of the object's bin-resolved pieces. The self-object cross products may contribute to finding the target that produced them, because in an instance in which the motion hypothesis lag is imperfect, the self-object cross products may afford product detections which are located in bins within those which define the target, even as it moves. This behavior gives rise to a performance trade between imperfect motion hypotheses lag and the ability to detect and velocity discriminate objects, at least initially, with fewer hypotheses. This embodiment may be used recursively, to narrow down the motion hypothesis lag error, and simultaneously reduce the self-object cross-products of a given object. As this occurs in a recursive NAMD process scheme, motion discovery and discrimination become more precise, as more finely spaced motion hypotheses are examined.

In sensor based applications, depending on clutter density, the NAMD process may achieve velocity discrimination, since any velocities distinct from a hypothesized velocity may not correlate well, and thus may not be detected. Velocity has a different meaning in a static scene. In static image processing applications, the smooth curves or lines are the changing velocities (curves) or fixed velocities (lines). In such scenes, the two measurements may be taken at different spatial locations, such as adjacent rows or columns, etc., of pixels in the image. In a moving image, a dynamic sequence of images, the two measurements may be taken in the same row, column, diagonal, or the like, of pixels in two consecutive imaged frames.

The NAMD process may extend to longer products, not merely two adjacent pulses (or rows of an image or frames of a movie) may be so correlated. Some example correlations may include many consecutive pulses (or rows), or many pulses (or rows), which may be consecutive or non-consecutive. As the length (number of pulses or rows) spanned by this product operator is increased, any motion hypothesis may become more discriminating. The signal products of correctly aligned bins may be sustained at high levels in instances in which the motion hypothesis is more closely matched to the actual motion. In other words, the mismatch of still smaller motion hypothesis errors may be more noticeable with longer products.

The NAMD process may behave as a clutter suppression filter. In an instance in which the actual motion of a desired object, e.g. a target, is within certain bounds of the motion hypothesis movement, the NAMD process may produce high signal products, and these signal products may become target detections by one of a number of subsequent operations. In an instance in which undesired objects, e.g. clutter, have motions distinct from the motion hypothesis, the NAMD process may produce low signal products, and these signal products may become eliminated from the measurement set for that motion hypothesis by the same subsequent operation used for target detection. It is significant to recognize that these clutter objects may become eliminated even without integration. The motion mismatch of the clutter objects alone may suppress clutter (mismatched) objects in a single pulse, and give evidence of this in the new image sequence of the NAMD process, just as quickly. In contrast, using suppression of nearly covelocity clutter by a filter notch, the clutter cannot be suppressed if the clutter resides outside the notch.

By contrast, integration of two pulses in a clutter bin may yield a one-pulse clutter response, in an instance in which the clutter is fully absent in the second pulse. The S/C discrimination skill of the two pulse integrator may be marginal, unless SNR is extremely large. A target seen on both integrator pulses at level S is only larger than a clutter bin by S–C, when the clutter has amplitude C and is present for just one pulse. The NAMD process's product may give $S^2$ for the steady target and CN for the clutter where N is the noise-only response on the pulse that has no clutter. The discrimination advantage may favor the product (vice an integrator) already in this short two-pulse observation. The quickness of the NAMD process is also desirable over the slower integration. FIG. 10 illustrates a discrimination advantage of NAMD over an integrator. Graph 1000 depicts C/S ratios from 0.1 to 10. From the ratio of signal-to-clutter detection power-statistic for each device and take their ratio as the advantage, here shown in dB. Larger SNR (top curve) offers more evidence of detecting target and rejecting clutter, and at all C/S ratios, than does the two-pulse integrator. The 10 dB SNR (middle curve) has advantages at all C/S ratios. The weaker SNR (bottom curve) still has NAMD advantages, especially for C/S ratios below unity.

Once the product's squared-signal is interpreted on an equal detection basis with the integrator with respect to noise, the absence of clutter on one of two pulses may be substantial in the correlator's product, but may only marginally be noticed by a two-pulse integrator. Graph 1100 of FIG. 11 illustrates the correlator's response to the squared signal, and the much lower product response of clutter with noise. While the integrator was not illustrated, the integrator may not lose, nor gain, performance with respect to the product for the target in the two pulses, at least not in the presence of just noise. This may be due to log detectors generally being equal to the performance of linear and square-law detectors. The product of the NAMD process may be substantially similar to a log-detector when it comes to behavior in noise alone. This may be due to the antilog of the sum of logs being substantially similar to the product in the NAMD process. The sum of logs may be the result of a noncoherent summer when following a log detector. A monotonic function of a detection discriminate may have equal performance to another in regards to performance in noise. The antilog may be an example of the monotonic function, and so the product operation of the NAMD process may have substantially similar receiver noise performance as linear, square-law, and log-detectors, and as summed in non-coherent integrators.

Turning to tracking, depending on object density, tracks may be either already developed by the correlator in the NAMD process, or may be produced by Euclidean distance association methods (including but not limited to Kalman filters), from detections after these sequential correlation operations are performed across the measurement matrix, e.g. the image. In clutter densities that approach a total and dominant covering of the smaller target, the NAMD process may at least match performance of the integrator, because the NAMD process final step may include integration, for example, once the motion hypotheses separates the objects in velocity classes.

The values measured in the image may be selected as one of many observed signal attributes, such as magnitude, phase, polarization, gray scale, color attribute, or even nonlinear combinations of these. Even combinations (or functions) of sets of signals taken in neighboring resolution bins may be used as measurements to be correlated. Applications include sensor measurements, e.g., radar, sonar, IR, optics, as well as still images and moving images. The measurements may arise from non-coherent, e.g., passive, observations, else from active observations, specifically those of coherent or non-coherent echoes.

Detection of small signals fully embedded in clutter may traditionally be avoided because it is frequently difficult or impossible to do so reliably. Traditional detection and tracking systems, such as CFAR schemes, are generally adopted to lift the threshold and preclude clutter detections, but this may also preclude small (and clutter-sized) target detection. Significantly, the current methods of detecting small signals (targets) embedded in clutter use integration, either across time or space. Integration may utilize motion compensation (MC), to maintain the target in the resolution bin during integration. When the motion is uncertain, integration may still be used where the motion uncertainty may be mitigated by multiple hypotheses (MH), e.g. by MHMC. The difficulty with MHMC is that too much uncertainty may lead to too many hypotheses, which leads to complexity, but more significantly, to too many false alarms, or both. Too many alarms may result in low confidence, and often useless detection results, which may necessitate the use of a higher threshold, resulting in few or no target detections at all. The NAMD process may achieve detections and subsequent tracks where even integration with MHMC fails because it replaces integration with sequential correlations, which require far fewer motion hypotheses for a given total uncertainty that spans both spatial and motion uncertainties.

In an instance in which either the target, the clutter, or both move, but distinctly, the NAMD process may achieve unusually high level of sub-clutter visibility, even when the clutter frequently occupies bins near the target resolution bins, and further, even when the clutter sometimes occupies some of the same bins as the target. CFAR schemes may not afford the level of small-signal detection as the NAMD process.

Time or spatial decorrelation of the clutter signal may be useful in integrators, and also the NAMD process. Similarly, both the NAMD process and integrators may benefit when the clutter exits the resolution bin. In an example comparison case in which clutter momentarily de-correlates to a substantially small level, the integrator's sum is only slightly reduced by this brief absence of clutter. Similarly, if the clutter is only weak for a brief time, the NAMD process's measurement product is only small for a brief time. However, in an instance in which the clutter exits the bin during an integration period, the final integrator sum may be reduced by half if the exit occurs midway through the integration. In contrast, the sequential, and longer multipulse correlator products of the NAMD process, may be reduced to very small clutter product-responses when the clutter is absent in any part of the product. The correlation products may be made longer, e.g. multiple pulses, and/or span several pulses, even if only a few sparse pulses are used to form one product, which may provide an opportunity for clutter to be absent within a bin-sequence which the product correlator examines. In an instance in which the clutter vanishes on just one such pulse in the correlator product, product thresholding may cause the clutter to be immediately dropped from that location in the image. In contrast, in an instance in which the target de-correlates slowly over the time period spanned by the correlator product, the target detection may be maintained by the correlator.

Another distinction between the NAMD process and integrators may be the complexity and number of motion hypotheses needed to find targets and suppress clutter. In an instance in which fixed length integrators begin, then terminate, and begin anew, the bin location of the motion hypothesis may follow the cumulative sum of the motion. Even integrate and dump integrators may follow the cumulative sum of the motion. As new integrators begin, the integrators test the motion from ever-changing bin locations. By contrast, the products of the NAMD process may be formed leading to correlations in the entire bin-set, and though the target moves through the correlator's bin set, the correlation may accrue at each correlator operation, which may provide evidence of the target trajectory after each product operation in the image. Instead, of beginning new integrations in many locations and with many velocity hypotheses, the product operations of the NAMD process may provide evidence of the target locations (for a particular velocity hypothesis) wherever they are in the bin-set, as the operation proceeds across the time domain of the image. A similar motion hypothesis and complexity advantage may occur to discover smooth curves or lines in a fixed scene, such as in image processing applications.

In an example embodiment, final processing may include integration and final optimal tracking, given the scene or image as modified and significantly-thinned the NAMD process. In fact the first scene output from the NAMD process for a given motion hypothesis is a group of detections that resemble tracks, which may be well spaced, depending on the clutter and targets that are present. In one velocity-minded embodiment, the scene has detections along nearly parallel lines. Certain track lines may appear owing to targets or clutter, having more sparse appearance (fewer and/or weaker detections) when their actual motion deviates from the motion hypothesis. Signal and clutter fading may also cause track appearances to be sparse in the image. Additional tracks may appear with sometimes vastly different slopes because of self-target signal cross-products for wider targets or similarly for wider clutter moving in target-like fashion. The disparate slopes may not be retained in this motion hypothesis. In an example embodiment, parallel lines having nearly the same slope as the motion hypothesis may be retained in the scene of this motion hypothesis. Other detections (and track candidates) may be expected, and as discussed, ignored or removed even though they appear in this example scene to be track-like in their appearance. The ignored detections may have the wrong motion hypothesis, and may have their own motion hypothesis, within which they will be kept as detections and tracks matching some other motion hypotheses.

In an example embodiment, the NAMD processed image may be realigned, by a rotation, according to the motion hypothesis. One example realignment may make the hypothesized motion appear vertical and thereby retain only near vertical lines in the aligned image. This alignment may allow integration, including moving window integrators, to be applied with relative ease. In an example embodiment, the image analyzer 100 may add the complex samples, or magnitudes of detected samples (or all sample in spite of pre-detection) vertically, or nearly vertical by adding an additional motion hypotheses near the now vertical motion. Row-wise blurring by a convolution along the bins may also be used (initially) to maintain the object in the integration cell, which may tend to mitigate residual motion and previous processing errors.

In an example embodiment, application of the NAMD process may enable Euclidian based association and resultant tracking even in scenes with densely overlaid clutter over the target objects, since the NAMD process has eliminated vast amounts of signals from the original image scene, with little or no effect on the objects to be tracked.

Example Distributed Graph Processing Flow Chart

From a technical perspective, the NAMD module 44 described above may be used to support some or all of the operations described above. As such, the apparatus described in FIG. 2 may be used to facilitate the implementation of several computer program and/or network communication based interactions. As such, the platform described in FIG. 2 may be used to facilitate the implementation of several computer program and/or network communication based interactions. As an example, FIG. 12 is a flowchart of a method and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In this regard, a method according to one embodiment of the invention is shown in FIG. 12. The method may be employed for image analysis. The method may include, receiving at least one image comprising a first and second set of bins, at operation 1202. The method may also include shifting the first or second sets of bins by a number of bins associated with a motion hypothesis to achieve a set of aligned bins, at operation 1208. At operation 1210, the method may include determining a product for each set of aligned bins. The method may include comparing the product for each set of aligned bins to a product threshold at operation 1212, setting bins that do not exceed the product threshold to zero at operation 1214, and identifying objects based on the products that exceed the product threshold or the second products that exceed the second product threshold at operation 1228.

In an example embodiment, the method may optionally include, as denoted by the dashed box, comparing the bins of the at least one image to a detection threshold, at operation 1204. The method may optionally include setting bins of the at least one image that fail to exceed the detection threshold to zero, at operation 1206, and receiving a third set of bins, at operation 1216. The method may optionally include comparing the third set of bins to the detection threshold, at operation 1218. In an example embodiment, the method may include setting bins of the third set of bins that fail to exceed the detection threshold to zero, at operation 1220, shifting the products of the aligned bins by the number of bins associated with the motion hypothesis at operation 1222, and determining a second product of aligned bins and the third set of bins at operation 1224. In some example embodiments, the method may include comparing the second product to a second product threshold at operation 1226, identifying an object track at operation 1230, and aligning the image based on the motion hypothesis at operation 1232.

In an example embodiment, an apparatus for performing the method of FIG. 12 above may comprise a processor (e.g., the processor 52) or processing circuitry configured to perform some or each of the operations (1202-1232) described above. The processor may, for example, be configured to perform the operations (1202-1232) by performing hardware implemented logical functions, executing stored instructions, or executing algorithms for performing each of the operations. In some embodiments, the processor or processing circuitry may be further configured for additional operations or optional modifications to operations 1202-1232. In this regard, in an example embodiment, bins associated with a product that fails to exceed the product threshold are set to zero. In some example embodiments, the processing circuitry is further configured to receive a third set of bins, shift the products of the aligned bins by the number of bins associated with the motion hypothesis to achieve second sets of aligned bins, determine a second product of each of the aligned bins of the second sets of aligned bins, compare the second products to a second product threshold, and identify the object based on the second products that exceed the second product threshold. In an example embodiment, the processing circuitry is further configured to identify an object track based on the identified object. In some example embodiments, the identified object includes a group of one or more associated bins. In an example embodiment, the processing is further configured to compare the first and second sets of bins to a detection threshold and set bins that fail to exceed the detection threshold to zero. In some example embodiments, the product threshold is the detection threshold squared. In an example embodiment, the processing circuitry is further configured to receive a third image comprising a plurality of bins, shift the products of the aligned bins by the number of bins associated with the motion hypothesis to achieve second sets of aligned bins, determine a second product of each of the aligned bins of the second sets of aligned bins, compare the second products to a second product threshold, and identify a second object based on the second products that exceed the second product threshold. The second product threshold comprises the detection threshold cubed. In some example embodiments, the motion hypothesis is based on an object velocity. In an example embodiment, the processing circuitry is further configured to align the image based on the motion hypothesis.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring device s are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An image analyzer comprising processing circuitry and computer product code configured to:
   receive at least one image associated with a first set of bins and a second set of bins;
   shift the first or second sets of bins by a number of bins associated with a motion hypothesis to achieve sets of aligned bins;
   determine products for each set of aligned bins;
   compare the products to a product threshold; and
   identify an object based on the products that exceed the product threshold.

2. The image analyzer of claim 1, wherein bins associated with a product that fails to exceed the product threshold are set to zero.

3. The image analyzer of claim 1, wherein the processing circuitry is further configured to:
   receive a third set of bins;
   shift the products of the aligned bins by the number of bins associated with the motion hypothesis to achieve second sets of aligned bins;
   determine second products of each of the aligned bins of the second sets of aligned bins;
   compare the second products to a second product threshold; and
   determine the object based on the second products that exceed the second product threshold.

4. The image analyzer of claim 3, wherein the processing circuitry is further configured to:
   identify an object track based on the identified object.

5. The image analyzer of claim 3, wherein the identified object occupies a group of one or more associated bins.

6. The image analyzer of claim 1, wherein the processing circuitry is further configured to:
   compare the first and second sets of bins to a detection threshold; and
   set bins that fail to exceed the detection threshold to zero.

7. The image analyzer of claim 6, wherein the product threshold is the detection threshold squared.

8. The image analyzer of claim 7, wherein the processing circuitry is further configured to:
   receive a third set of bins;
   shift the aligned bins by the number of bins associated with the motion hypothesis to achieve second sets of aligned bins;

determine second product of each of the aligned bins of the second sets of aligned bins;

compare the second products to a second product threshold; and identify the object based on the second products that exceed the second product threshold, wherein the second product threshold comprises the detection threshold cubed.

9. The image analyzer of claim 1, wherein the motion hypothesis is based on an object velocity.

10. The image analyzer of claim 1, wherein the processing circuitry is further configured to:

align the at least one image based on the motion hypothesis.

11. An image analyzer system comprising:

a sensor configured to capture images; and an image analyzer comprising processing circuitry configured to:

receive at least one image associated with a first set of bins and a second set of bins;

shift the first or second sets of bins by a number of bins associated with a motion hypothesis to achieve sets of aligned bins;

determine products for each set of aligned bins;

compare the products to product threshold; and identify an object based on the products that exceed the product threshold.

12. The image analyzer of claim 11, wherein bins associated with a product that fails to exceed the product threshold are set to zero.

13. The image analyzer of claim 11, wherein the processing circuitry is further configured to:

receive a third set of bins;

shift the products of the aligned bins by the number of bins associated with the motion hypothesis to achieve second sets of aligned bins;

determine second product of each of the aligned bins of the second set of aligned bins;

compare the second products to a second product threshold; and identify a second object based on the second products that exceed the second product threshold.

14. The image analyzer of claim 13, wherein the processing circuitry is further configured to:

identify an object track based on the identified object.

15. The image analyzer of claim 13, wherein the identified object occupies a group of one or more associated bins.

16. The image analyzer of claim 11, wherein the processing circuitry is further configured to:

compare the first and second sets of bins to a detection threshold; and set bins which fail to exceed the detection threshold to zero.

17. The image analyzer of claim 16, wherein the product threshold is the detection threshold squared.

18. The image analyzer of claim 17, wherein the processing circuitry is further configured to:

receive a third set of bins;

shift the products of the aligned bins by the number of bins associated with the motion hypothesis to achieve second sets of aligned bins;

determine second product of each of the aligned bins of the second sets of aligned bins;

compare the second product to a second product threshold; and identify the object based on the second products that exceed the second product threshold, wherein the second product threshold comprises the detection threshold cubed.

19. The image analyzer of claim 11, wherein the motion hypothesis is based on an object velocity.

20. The image analyzer of claim 11, wherein the processing circuitry is further configured to:

align the at least one image based on the motion hypothesis.

* * * * *